(12) United States Patent
Jin et al.

(10) Patent No.: US 11,228,934 B2
(45) Date of Patent: Jan. 18, 2022

(54) METHOD AND APPARATUS FOR UPDATING LIST OF CELLS TO BE MEASURED IN RESELECTION OF CELL IN IDLE MODE IN NEXT-GENERATION WIRELESS COMMUNICATION SYSTEM

(71) Applicant: Samsung Electronics Co., Ltd., Suwon-si (KR)

(72) Inventors: Seungri Jin, Suwon-si (KR); Soenghun Kim, Suwon-si (KR); Sangbum Kim, Suwon-si (KR); Himke Van Der Velde, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 82 days.

(21) Appl. No.: 16/785,415

(22) Filed: Feb. 7, 2020

(65) Prior Publication Data

US 2020/0260308 A1    Aug. 13, 2020

(30) Foreign Application Priority Data

Feb. 8, 2019    (KR) ........................ 10-2019-0015128

(51) Int. Cl.
*H04W 24/10*    (2009.01)
*H04L 5/00*    (2006.01)
(Continued)

(52) U.S. Cl.
CPC .......... *H04W 24/10* (2013.01); *H04B 17/318* (2015.01); *H04L 1/0026* (2013.01); (Continued)

(58) Field of Classification Search
CPC ...... H04W 24/10; H04W 8/24; H04B 17/318; H04L 5/0094
See application file for complete search history.

(56) References Cited

U.S. PATENT DOCUMENTS

2012/0076041 A1* 3/2012 Jung ............... H04W 24/10
370/252
2018/0359149 A1* 12/2018 Shaheen ........... H04W 72/0453
(Continued)

FOREIGN PATENT DOCUMENTS

KR    10-2019-0116885 A    10/2019
WO    2018/063437 A1    4/2018
WO    2018/146559 A1    8/2018

OTHER PUBLICATIONS

"LTE; Evolved Universal Terrestrial Radio Access (E-UTRA); Radio Resource Control (RRC); Protocol specification (3GPP TS 36.331 version 15.3.0 Release 15)", ETSI TS 136 331 V15.3.0 (Oct. 2018), 916 pages.

(Continued)

*Primary Examiner* — Jamal Javaid
*Assistant Examiner* — Ryan C Kavleski

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. In addition, a method of operating a terminal in a wireless communication system includes: receiving idle-mode measurement configuration from a base station; in response to the terminal entering an idle mode, performing idle-mode measurement, based on the measurement configuration; in response to the terminal entering a connected mode, producing a measurement result, based on the result of performing the measurement; and reporting the measurement result to the base station, wherein another measure- (Continued)

ment result for a carrier frequency, which does not support subcarrier spacing (SCS) supported by the terminal, among the carrier frequencies included a carrier frequency list included in the measurement configuration is not reported.

20 Claims, 21 Drawing Sheets

(51) Int. Cl.
*H04W 8/24* (2009.01)
*H04L 1/00* (2006.01)
*H04W 76/27* (2018.01)
*H04B 17/318* (2015.01)

(52) U.S. Cl.
CPC .............. *H04L 5/0094* (2013.01); *H04W 8/24* (2013.01); *H04W 76/27* (2018.02)

(56) References Cited

U.S. PATENT DOCUMENTS

| | | | |
|---|---|---|---|
| 2019/0037425 A1* | 1/2019 | Hong | H04W 72/042 |
| 2019/0313333 A1 | 10/2019 | Kim et al. | |
| 2019/0357215 A1* | 11/2019 | Zhou | H04L 5/0053 |
| 2020/0029239 A1* | 1/2020 | Chen | H04W 72/046 |

OTHER PUBLICATIONS

"3rd Generation Partnership Project; Technical Specification Group Radio Access Network; NR; User Equipment (UE) radio access capabilities (Release 15)", 3GPP TS 38.306 V15.4.0 (Dec. 2018), 40 pages.

International Search Report dated May 18, 2020 in connection with International Patent Application No. PCT/KR2020/001832, 3 pages.

* cited by examiner

METHOD AND APPARATUS FOR UPDATING LIST OF CELLS TO BE MEASURED IN RESELECTION OF CELL IN IDLE MODE IN NEXT-GENERATION WIRELESS COMMUNICATION SYSTEM

CROSS-REFERENCE TO RELATED APPLICATION

This application is based on and claims priority under 35 U.S.C. 119 to Korean Patent Application No. 10-2019-0015128, filed on Feb. 8, 2019, in the Korean Intellectual Property Office, the disclosure of which is herein incorporated by reference in its entirety.

BACKGROUND

1. Field

The disclosure relates to a method in which a terminal in an idle state updates a list of cells to be measured when reselecting a cell, and an apparatus for performing the method.

The disclosure also relates to a method for collecting and reporting idle-mode measurement information in a next-generation mobile communication system and an apparatus for performing the method.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

The disclosure relates to a technique for improving carrier aggregation technology applied to an LTE system and a next-generation mobile communication system, wherein a terminal in an idle state may measure neighboring cells, may record the measurement values thereof, may establish an RRC connection with a specific cell, and may transmit stored measurement values for the neighboring cells to a base station, and the base station may transmit, to the terminal, an instruction for quick configuration and activation of carrier aggregation. However, in the conventional operation, since the terminal in an idle mode continues to use an idle-mode measurement cell list, which is configured by a previous cell, when reselecting a cell, accurate measurement is difficult, and the corresponding cell list is required to be updated.

In addition, the terminal has supportable subcarrier spacing (SCS), and there is SCS that can be supported in a specific frequency. If the SCS supported by the terminal is not supported in a specific frequency, the terminal is not able to use the frequency. Thus, even if the terminal performs an idle-mode measurement operation on the frequency and reports the same, the frequency cannot be used. It is therefore wasteful to perform an idle-mode measurement operation on the frequency.

In order to solve the problems above, the disclosure provides a method of operating a terminal in a wireless communication system, which includes: receiving idle-mode measurement configuration from a base station; in case that the terminal enters an idle mode, performing idle-mode measurement, based on the measurement configuration; in case that the terminal enters a connected mode, producing a measurement result, based on the result of performing the measurement; and reporting the measurement result to the base station, wherein a measurement result for a carrier frequency, which does not support subcarrier spacing (SCS) supported by the terminal, among the carrier frequencies included a carrier frequency list included in the measurement configuration, is not reported.

In order to solve the problems above, the disclosure also provides a method of operating a base station in a wireless communication system, which includes; transmitting idle-mode measurement configuration to a terminal; performing a radio resource control (RRC) connection procedure for switching the terminal from an idle mode to a connected mode; and receiving a measurement result measured in the idle mode from the terminal, wherein a measurement result for a carrier frequency, which does not support subcarrier spacing (SCS) supported by the terminal, among the carrier frequencies included a carrier frequency list included in the measurement configuration, is not reported.

In order to solve the problems above, the disclosure also provides a terminal in a wireless communication system, which includes: a transceiver; and a controller configured to receive idle-mode measurement configuration from a base station through the transceiver, in case that the terminal enters an idle mode, perform idle-mode measurement, based on the measurement configuration, in case that the terminal enters a connected mode, produce a measurement result, based on the result of performing the measurement, and report the measurement result to the base station through the transceiver, wherein a measurement result for a carrier frequency, which does not support subcarrier spacing (SCS) supported by the terminal, among the carrier frequencies included a carrier frequency list included in the measurement configuration, is not reported.

In order to solve the problems above, the disclosure also provides a base station in a wireless communication system, which includes: a transceiver; and a controller configured to transmit idle-mode measurement configuration to a terminal through the transceiver, perform a radio resource control (RRC) connection procedure for switching the terminal from an idle mode to a connected mode, and receive a measurement result measured in the idle mode from the terminal through the transceiver, wherein a measurement result for a carrier frequency, which does not support subcarrier spacing (SCS) supported by the terminal, among the carrier frequencies included a carrier frequency list included in the measurement configuration, is not reported.

The disclosure proposes a method of updating a cell list for measurement by the terminal in an idle mode, which makes it possible to improve the carrier aggregation performed by an existing terminal, that is, to cause the terminal in an idle mode to accurately perform measurement of neighboring cells for fast carrier aggregation even when reselecting a cell.

In addition, the disclosure enables the terminal to perform an idle-mode measurement operation only on the frequencies supported by the terminal, such as SCS, thereby reducing UE complexity.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals are like parts.

DETAILED DESCRIPTION

FIGS. 1A through 2J, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operating principle of the disclosure will be described in detail with reference to the accompanying drawings. In describing the disclosure below, a detailed description of related known configurations or functions incorporated herein will be omitted when it is determined that the detailed description thereof may unnecessarily obscure the subject matter of the disclosure. The terms which will be described below are terms defined in consideration of the functions in the disclosure, and may be different according to users, intentions of the users, or customs. Therefore, the definitions of the terms should be made based on the contents throughout the specification. In the following description, terms for identifying an access node, terms referring to network entities, terms referring to messages, terms referring to interfaces between network entities, and terms referring to various pieces of identification information are used for convenience of description. Accordingly, the disclosure is not limited to the following terms and other terms having the same technical meaning may be used.

For convenience of description, the disclosure uses terms and names defined in a 3GPP LTE (3rd Generation Partnership Project Long Term Evolution). However, the disclosure is not limited by the terms and names, and may be equally applied to a system that is based on another standard.

Figure 1A:
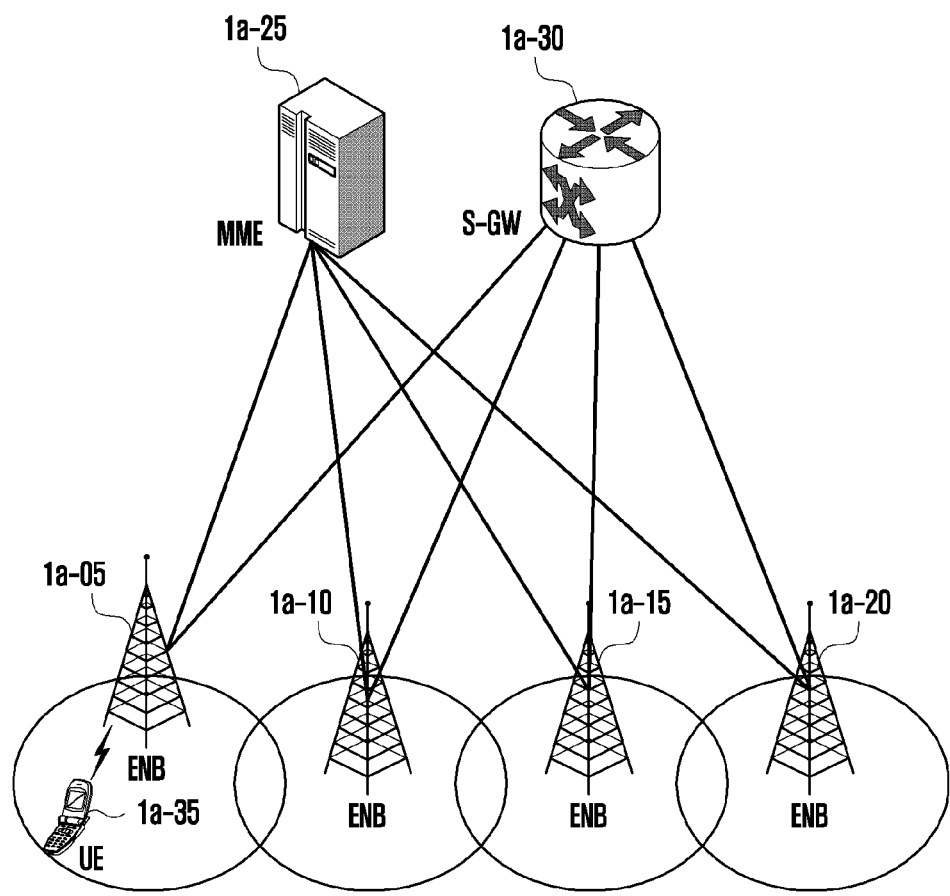
FIG. 1A is a diagram illustrating the structure of an LTE system for reference in order to explain the disclosure.

FIG. 1A is a diagram illustrating the structure of an LTE system as a reference for the description of the disclosure.

Referring to FIG. 1A, a radio access network of an LTE system may include Evolved Node Bs (hereinafter, referred to as "eNBs", "Node Bs", or "base stations") 1a-05, 1a-10, 1a-15, and 1a-20, a mobility management entity (MME) 1a-25, and a serving-gateway (S-GW) 1a-30. User equipment (hereinafter, referred to as "UE" or "terminal") 1a-35 accesses an external network through the eNBs 1a-05 to 1a-20 and the S-GW 1a-30.

In FIG. 1A, the eNBs 1a-05 to 1a-20 correspond to existing Node Bs of a UMTS. The eNBs are connected to the UE 1a-35 via a radio channel, and may play a more complex role than the existing Node B. In the LTE system, all user traffic including real-time services, such as voice-over-IP (VoIP) through the Internet protocol, is served through a shared channel. Therefore, a device for collecting status information, such as buffer status, available transmission power status, and channel status of UEs, and performing scheduling is required. The eNBs 1a-05 to 1a-20 may serve as such a device.

One eNB typically controls multiple cells. For example, in order to realize a data rate of 100 Mbps, the LTE system uses, as radio access technology, orthogonal frequency division multiplexing (hereinafter, referred to as "OFDM") in, for example, a 20 MHz bandwidth. Further, an adaptive modulation and coding (hereinafter, referred to as "AMC") scheme is applied to determine a modulation scheme and a channel coding rate in accordance with the channel status of a terminal. The S-GW 1a-30 is a device for providing data bearers, and generates or removes data bearers under the control of the MME 1a-25. The MME 1a-25 is a device that performs various control functions, as well as a mobility management function for a terminal, and may be connected to a plurality of base stations.

Figure 1B:
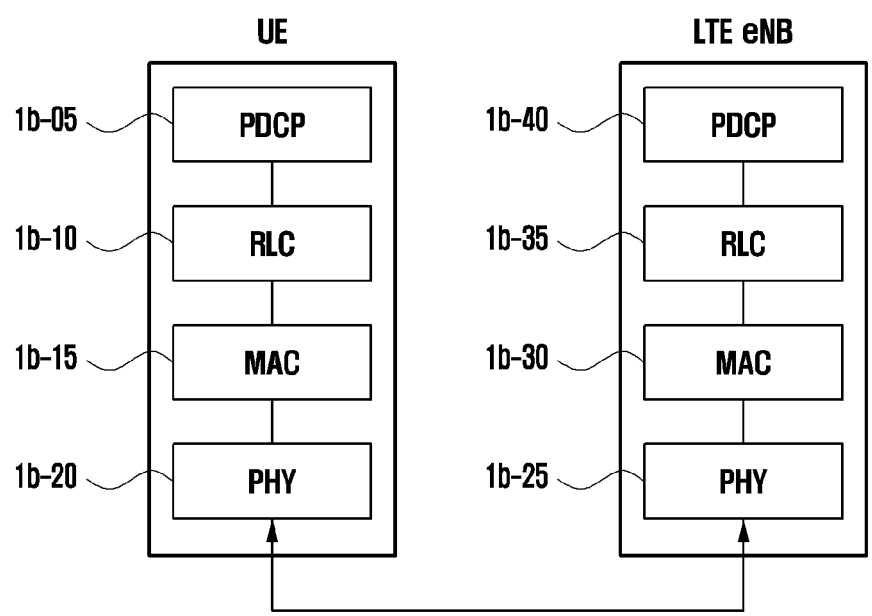
FIG. 1B is a diagram illustrating a radio protocol structure of an LTE system for reference in order to explain the disclosure.

FIG. 1B is a diagram illustrating a radio protocol structure of an LTE system as a reference for the description of the disclosure.

Referring to FIG. 1B, the radio protocol of an LTE system includes a packet data convergence protocol (PDCP) 1b-05 or 1b-40, a radio link control (RLC) 1b-10 or 1b-35, and a medium access control (MAC) 1b-15 or 1b-30 in a terminal and an eNB, respectively. The PDCP 1b-05 or 1b-40 performs operations, such as IP header compression/decompression and the like. The primary functions of the PDCP are summarized as follows.

Header compression and decompression (ROHC only)

Transfer of user data

In-sequence delivery of higher-layer PDUs at PDCP re-establishment procedure for RLC AM Sequence reordering {for split bearers in DC (only support for RLC AM): PDCP PDU routing for transmission and PDCP PDU reordering for reception}

Duplicate detection of lower-layer SDUs at PDCP re-establishment procedure for RLC AM Retransmission of PDCP SDUs at handover and, for split bearers in DC, of PDCP PDUs at PDCP data-recovery procedure, for RLC AM Ciphering and deciphering Timer-based SDU discard in uplink.

The radio link control (hereinafter, also referred to as "RLC") 1b-10 or 1b-35 reconfigures a PDCP PDU (packet data unit) to an appropriate size and performs ARQ operation and the like. The primary functions of the RLC are summarized as follows.

Data transfer function (transfer of higher-layer PDUs)

ARQ function {error correction through ARQ (only for AM data transfer)}

Concatenation, segmentation, and reassembly of RLC SDUs (only for UM and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MAC 1b-15 or 1b-30 is connected to a plurality of RLC entities configured in a single terminal, multiplexes RLC PDUs into MAC PDUs, and demultiplexes RLC PDUs from MAC PDUs. The primary functions of the MAC are summarized as follows.

Mapping between logical channels and transport channels

Multiplexing/demultiplexing of MAC SDUs belonging to one or different logical channels into/from transport blocks (TB) delivered to/from the physical layer on transport channels Scheduling information reporting HARQ function (error correction through HARQ)

Priority handling between logical channels of one UE

Priority handling between UEs by means of dynamic scheduling

MBMS service identification

Transport format selection

Padding

The physical layers 1b-20 and 1b-25 channel-code and modulate higher-layer data, and convert the same into OFDM symbols that are then transmitted through a radio channel, or demodulate OFDM symbols received through a radio channel and channel-decode the same, and then transmit the same to higher-layers. In addition, the physical layer uses Hybrid ARQ (HARQ) for additional error correction, and the receiving entity transmits 1-bit information indicating whether or not the packet transmitted by the transmitting entity is received. This is called "HARQ ACK/NACK" information. Downlink HARQ ACK/NACK information for uplink transmission may be transmitted through a Physical Hybrid-ARQ Indicator Channel (PHICH), and uplink HARQ ACK/NACK information for downlink transmission may be transmitted through a Physical Uplink Control Channel (PUCCH) or a Physical Uplink Shared Channel (PUSCH).

Meanwhile, the PHY layer may include one or more frequencies/carriers, and a technique of simultaneously configuring and using a plurality of frequencies is called "carrier aggregation" (hereinafter, referred to as "CA"). CA may use one or more subcarriers, as well as a primary carrier, thereby significantly increasing the amount of transmission by the number of subcarriers compared to existing communication between a terminal {or user equipment (UE)} and a base station {E-UTRAN Node B (eNB)}, which can use only a single carrier. Meanwhile, in LTE, the cell in a base station using a primary carrier is called a "primary cell" (PCell), and the cell using a subcarrier is called a "secondary cell" (SCell).

Although not shown in the drawing, an RRC (Radio Resource Control) (hereinafter, referred to as "RRC") layer is above the PDCP layer of the terminal and the base station, respectively, and the RRC layer may transmit and receive a configuration control message related to connection and measurement for radio resource control.

Figure 1C:
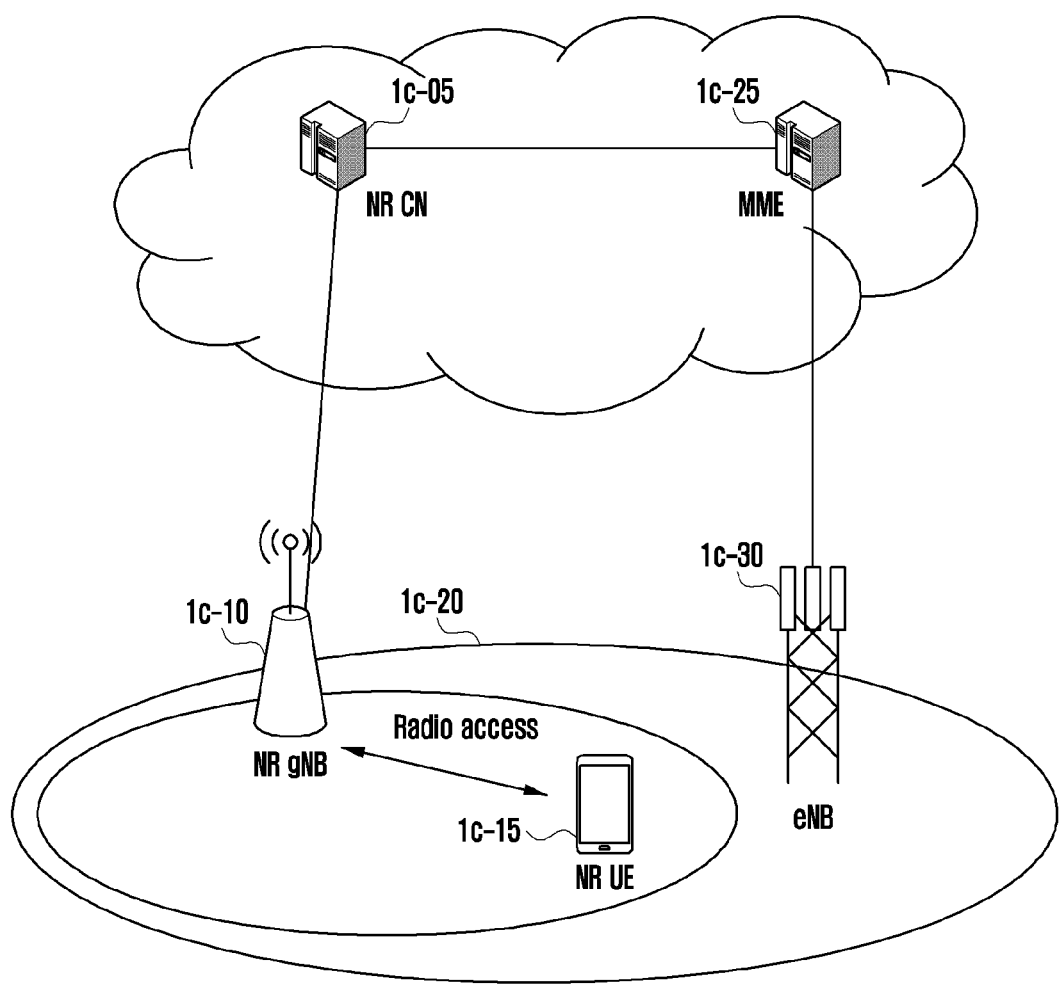
FIG. 1C is a diagram illustrating the structure of a next-generation mobile communication system to which the disclosure is applied.

FIG. 1C is a diagram illustrating the structure of a next-generation mobile communication system to which the disclosure is applied.

Referring to FIG. 1C, a radio access network of a next-generation mobile communication system includes a new radio node B (hereinafter, referred to as an "NR gNB" or "NR base station") 1c-10 and a new radio core network (NR CN) 1c-05. New radio user equipment (hereinafter, referred to as "NR UE" or "terminal") 1c-15 accesses an external network through the NR gNB 1c-10 and the NR CN 1c-05.

In FIG. 1C, the NR gNB 1c-10 corresponds to an evolved node B (eNB) in an existing LTE system. The NR gNB is connected to the NR UE 1c-15 through a radio channel, and may provide services superior to those of the existing node B. In the next-generation mobile communication system, all user traffic is served through a shared channel. Therefore, a device for collecting status information, such as buffer status, available transmission power status, and channel status of UEs, and performing scheduling is required. The NR gNB 1c-10 serves as such a device. In general, one NR NB may control multiple cells. In order to realize super-high data rates compared to the existing LTE system, the next-generation mobile communication system may have a bandwidth equal to or greater than the maximum bandwidth of the existing system. In addition, the next-generation mobile communication system may use, as radio access technology, orthogonal frequency division multiplexing (OFDM), and may further employ a beamforming technique in addition thereto.

In addition, an adaptive modulation and coding (hereinafter, referred to as "AMC") scheme may be applied to determine a modulation scheme and a channel coding rate in accordance with the channel status of a terminal. The NR CN 1c-05 performs functions such as mobility support, bearer configuration, and QoS configuration. The NR CN is a device that performs various control functions, as well as a mobility management function for a terminal, and may be connected to a plurality of base stations. In addition, the next-generation mobile communication system may inter-work with an existing LTE system, and the NR CN may be connected to the MME 1c-25 through a network interface. The MME may be connected to the eNB 1c-30, which is an existing base station in a network 1c-20 with the NR gNB 1c-10.

Figure 1D:
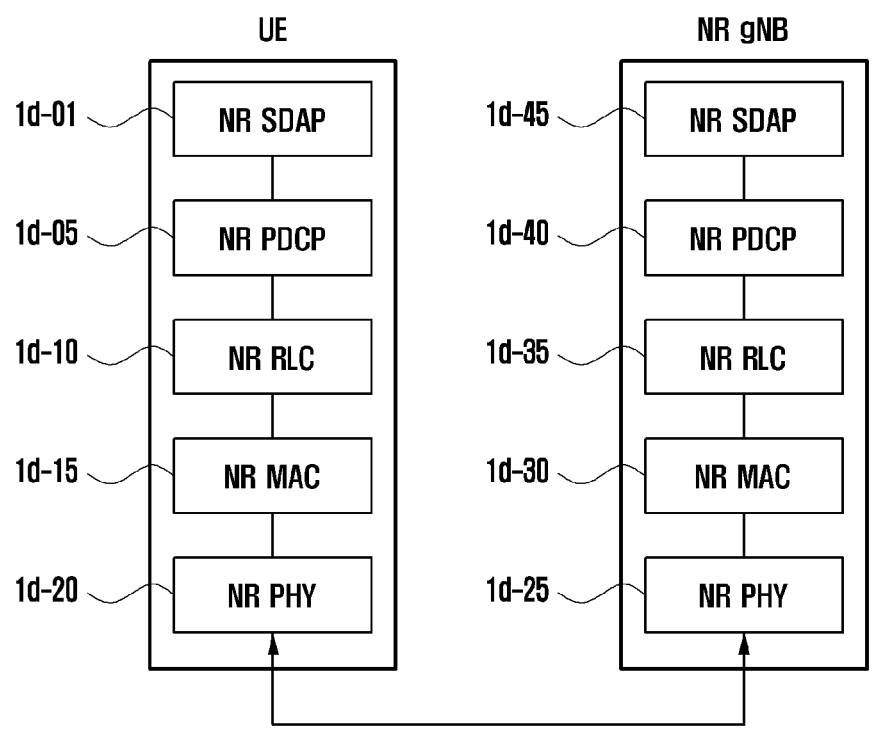
FIG. 1D is a diagram illustrating a radio protocol structure of a next-generation mobile communication system to which the disclosure may be applied.

FIG. 1D is a diagram illustrating a radio protocol structure of a next-generation mobile communication system to which the disclosure may be applied.

Referring to FIG. 1D, the radio protocol of the next-generation mobile communication system includes NR SDAP 1d-01 or 1d-45, NR PDCP 1d-05 or 1d-40, NR RLC 1d-10 or 1d-35, NR MAC 1d-15 or 1d-30, and NR PHY 1d-20 or 1d-25 in a terminal and an NR base station, respectively.

The primary functions of the NR SDAP 1d-01 or 1d-45 may include some of the following functions.

Transfer of user plane data

Mapping between QoS flow and DRB for downlink and uplink

Marking QoS flow ID in both downlink and uplink packets

Mapping reflective QoS flow to DRB for UL SDAP PDUs

With regard to the SDAP layer entity, the terminal may receive a configuration indicating whether or not to use a header of the SDAP layer entity or whether or not to use functions of the SDAP layer entity for each PDCP layer entity, for each bearer, or for each logical channel through an RRC message. In the case where the SDAP header is configured, a 1-bit NAS reflective QoS configuration indicator and a 1-bit AS reflective QoS configuration indicator of the SDAP header may instruct the terminal to update or reconfigure mapping information between the QoS flow and the data bearers in uplink and downlink. The SDAP header may include QoS flow ID information indicating the QoS. The QoS information may be used as data processing priority, scheduling information, or the like in order to support effective services.

The primary functions of the NR PDCP 1d-05 or 1d-40 may include some of the following functions.

Header compression and decompression (ROHC only)

Transfer of user data

In-sequence delivery of higher-layer PDUs

Out-of-sequence delivery of higher-layer PDUs

Sequence reordering (PDCP PDU reordering for reception)

Duplicate detection of lower-layer SDUs

Retransmission of PDCP SDUs

Ciphering and deciphering

Timer-based SDU discard in uplink

The above reordering function of the NR PDCP entity may denote a function of reordering PDCP PDUs received from a lower layer, based on a PDCP sequence number (SN). The reordering function of the NR PDCP entity may include a function of transmitting data to a higher layer in the reordered order, may include a function of directly transmitting data to a higher layer without consideration of the order thereof, may include a function of reordering the sequence and recording lost PDCP PDUs, may include a function of sending a status report of the lost PDCP PDUs to the transmitting end, and may include a function of making a request for retransmission of the lost PDCP PDUs.

The primary functions of the NR RLC 1d-10 or 1d-35 may include some of the following functions.

Data transfer function (transfer of higher-layer PDUs)

In-sequence delivery of higher-layer PDUs

Out-of-sequence delivery of higher-layer PDUs

ARQ function (error correction through ARQ)

Concatenation, segmentation, and reassembly of RLC SDUs

Re-segmentation of RLC data PDUs

Reordering of RLC data PDUs

Duplicate detection

Protocol error detection

RLC SDU discard

RLC re-establishment

The above in-sequence delivery function of the NR RLC entity may denote a function of transferring RLC SDUs received from a lower layer to a higher layer in sequence. The in-sequence delivery function of the NR RLC entity may include a function of, if one original RLC SDU is divided into a plurality of RLC SDUs and received, reassembling and transmitting the same, may include a function of reordering the received RLC PDUs, based on an RLC sequence number (SN) or a PDCP sequence number (SN), may include a function of reordering the sequence and recording lost RLC PDUs, may include a function of sending a status report of the lost RLC PDUs to the transmitting end, and may include a function of making a request for retransmission of the lost RLC PDUs. The in-sequence delivery function of the NR RLC entity may include a function of, if there is a lost RLC SDU, transmitting only the RLC SDUs preceding the lost RLC SDU to a higher layer in sequence, may include a function of, if a predetermined timer expires even though there is a lost RLC SDU, transmitting all RLC SDUs received before the timer starts to a higher layer in sequence, or may include a function of, if a predetermined timer expires even though there is a lost RLC SDU, transmitting all RLC SDUs received until that time point in time to a higher layer in sequence. In addition, the RLC PDUs may be processed in the order of reception (in the order of arrival, regardless of the sequence of serial numbers or sequence numbers), and may be transmitted to the PDCP entity in an out-of-sequence delivery manner. In the case of receiving segments, the NR RLC entity may receive the segments, which are stored in the buffer or will be received later, may reconfigure the same into one complete RLC PDU, and may process and transmit the same to the PDCP. The NR RLC layer may not include a concatenation function, which may be performed in the NR MAC layer or may be replaced with a multiplexing function of the NR MAC layer.

In the above description, the out-of-sequence delivery of the NR RLC entity may denote a function of directly delivering RLC SDUs received from a lower layer to a higher layer regardless of the sequence thereof. The out-of-sequence delivery of the NR RLC entity may include a function of if one original RLC SDU is divided into a plurality of RLC SDUs and is received, reassembling and delivering the same, and may include a function of storing and ordering RLC SNs or PDCP SNs of the received RLC PDUs, thereby recording the lost RLC PDUs.

The NR MAC 1d-15 or 1d-30 may be connected to a plurality of NR RLC entities configured in a single terminal, and the primary functions of the NR MAC may include some of the following functions.

Mapping between logical channels and transport channels

Multiplexing/demultiplexing of MAC SDUs

Scheduling information reporting

HARQ function (error correction through HARQ)

Priority handling between logical channels of one UE

Priority handling between UEs by means of dynamic scheduling

MBMS service identification

Transport format selection

Padding

The NR PHY layers 1d-20 and 1d-25 may perform operations of channel-coding and modulating the higher layer data into OFDM symbols and transmitting the same through a radio channel, or operations of demodulating and channel-decoding the OFDM symbols received through the radio channel and transmitting the same to the higher layer.

Figure 1E:
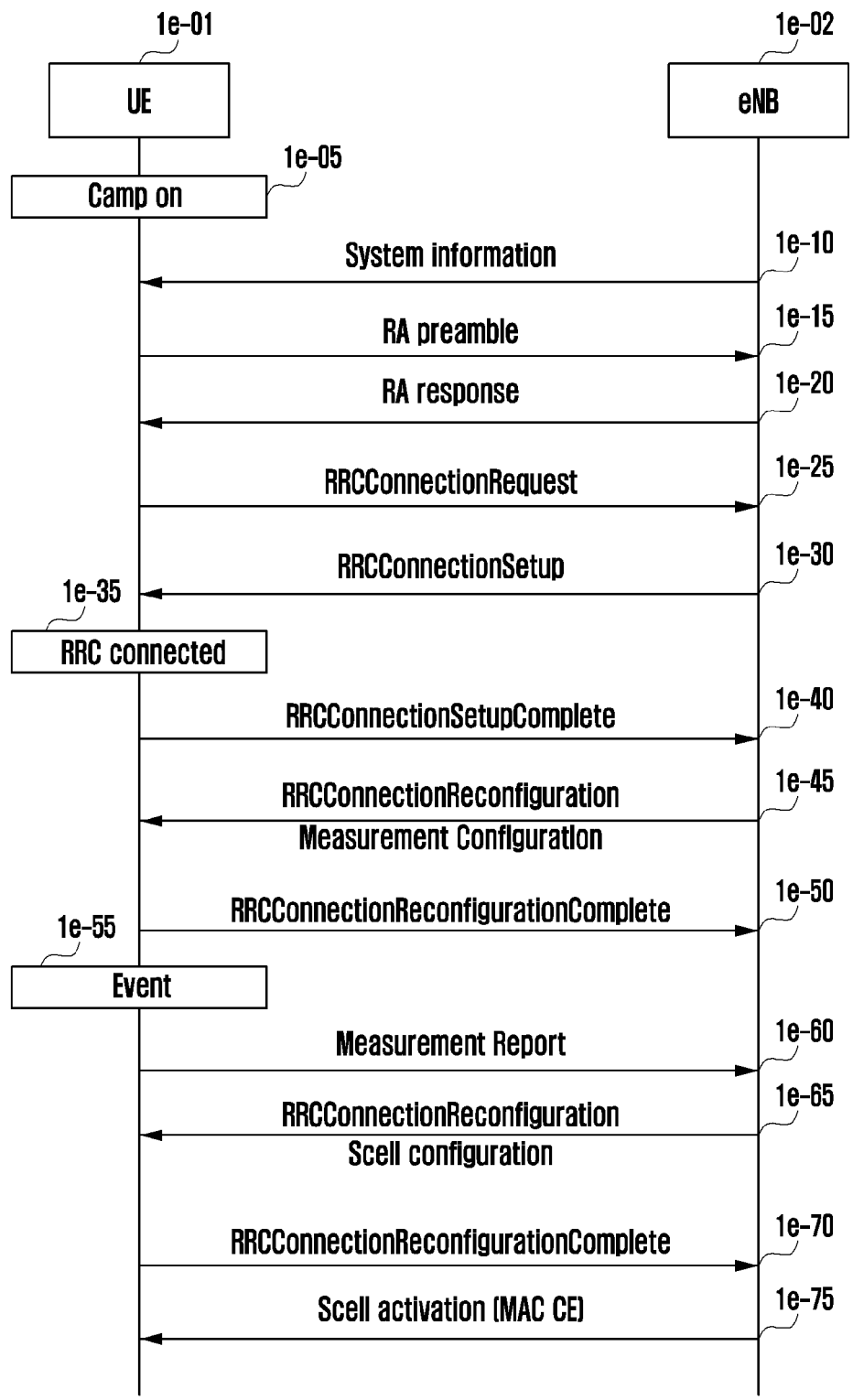
FIG. 1E is a diagram illustrating the overall operation in which a terminal switches to a connected state, measures neighboring cells, and performs carrier aggregation in an LTE system according to the disclosure.

FIG. 1E is a diagram illustrating the overall operation in which a terminal switches to a connected state, measures neighboring cells, and performs carrier aggregation in an LTE system according to the disclosure.

Reselecting a cell is a procedure in which a terminal determines the cell to camp on in the case where the quality of service with a serving cell is lower than the quality of service with a neighboring cell due to the movement of the terminal in an idle state (or idle mode). Handover is determined by a network (MME or a source eNB), whereas cell reselection is determined by the terminal, based on measurement values. In addition, the cell reselected by a moving terminal may be a cell using the same LTE frequency as the serving cell on which the terminal is currently camping (intra-frequency cell), a cell using an LTE frequency different from the serving cell (inter-frequency cell), or a cell using another radio access technique (inter-RAT cell).

The terminal 1e-01 in an idle state performs a series of operations while camping on a serving cell (1e-05). First, the terminal may receive a system information block (SIB) broadcast by the base station 1e-02 of the serving cell (1e-10). For reference, MIB, SIB1, and SIB2 are system information commonly applied to all terminals, and, for example, SIB3 to SIB8 may include information used for the terminal in the idle state to reselect a cell. In particular, information related to measurement of neighboring cells in LTE frequency (intra-frequency measurement) may be transmitted through SIB4, and information related to inter-frequency measurement may be transmitted through SIB5. The system information may include at least one of a threshold used to determine whether or not to measure neighboring cell signals, parameters used to calculate ranks of a serving cell and neighboring cells, and the like. In addition, for the intra-frequency measurement, since the carrier frequency is the same as the current serving cell, carrier frequency information is not separately signaled through SIB4, but SIB5 may specify carrier frequency information on the neighboring cells to be measured.

In addition, the terminal 1e-01 in an idle mode ("RRC_IDLE") finds an appropriate cell and camps on the base station thereof (1e-05), and connects to the base station due to causes such as occurrence of data to be transmitted (1e-15). Since the terminal is not connected to a network in the idle mode, for example, to reduce power consumption by the terminal, data cannot be transmitted. Thus, the terminal is required to switch to an RRC connected mode ("RRC_CONNECTED") for transmission of data. In addition, "camping" may mean that the terminal stays in the cell and receives a paging message to determine whether or not data is transmitted in downlink.

The access procedure of the terminal to the base station may denote performing a procedure of random access to the base station and the cell. That is, the terminal may transmit a terminal preamble (msg1) in step 1e-15, and the base station may transmit a random access response message (msg2) in response to the preamble to the terminal in step 1e-20.

In addition, the terminal may transmit an RRC connection request message (msg3) for requesting an RRC connection, which includes at least one of a terminal ID and a reason for connection, in step 1e-25, and the base station may transmit a response message (msg4) to the RRC connection request to the terminal in step 1e-30.

Upon receiving an RRC connection setup message, the terminal may determine that permission to switch to an RRC connected state has been received from the base station, and may transmit an RRC connection setup complete message to the base station in step 1e-40. In addition, the terminal switches to an RRC connected mode ("RRC_CONNECTED") (1e-35), so that the terminal in the connected mode may transmit/receive data to/from the base station.

In step 1e-45, the base station may transmit an RRC connection reconfiguration message including measurement configuration to the terminal. The measurement configuration included in the message may include at least one piece of information about intra/inter/inter-RAT neighboring cells required to be measured, information on the type of signal required to be measured, and information on the method of reporting measurement values. The terminal may transmit an RRC connection reconfiguration complete message in response to the message in steps 1e-50. If a measurement result for a specific measurement object satisfies measurement conditions for reporting, among the configured measurement configurations (1e-55), the terminal may report the measurement result to the base station according to a configured reporting method (1e-60).

In step 1e-65, the base station may recognize the channel states of neighboring cells, based on the measurement result reported by the terminal in the above step, thereby identifying cells having a good channel state.

In step 1e-70, the base station may configure carrier aggregation (CA) to the terminal for reasons such as increased traffic of the terminal, provision of better services, and the like, and cells having a good channel state identified above may be configured as secondary cells (SCells) for CA. The configuration is included in the RRC connection reconfiguration message and transmitted to the terminal, and upon receiving the message, the terminal may transmit a response message to the base station in step 1e-70. Thereafter, the base station transmits MAC CE for activating carrier aggregation for a specific cell, thereby activating CA, in step 1e-75.

Figure 1F:
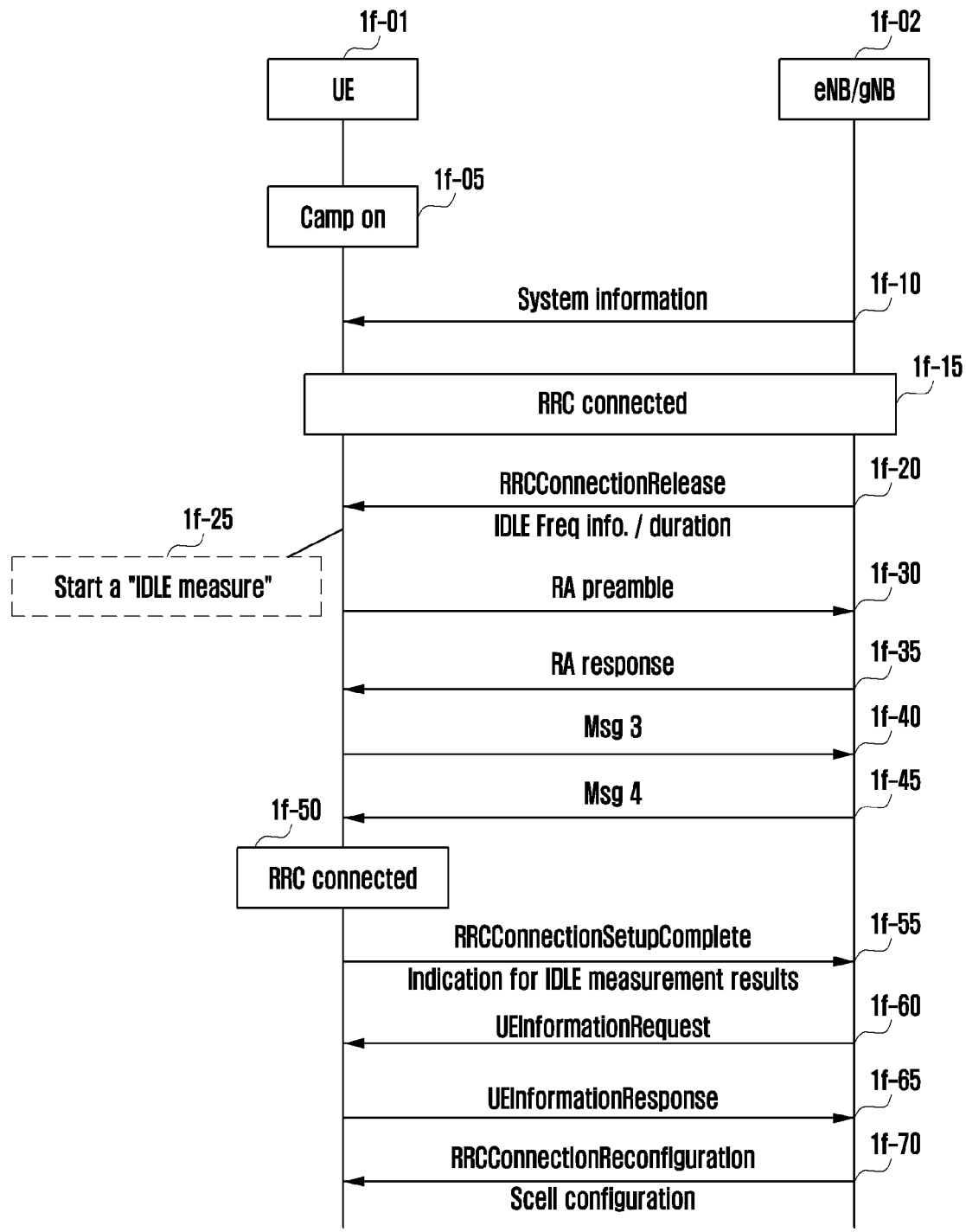
FIG. 1F is a diagram illustrating the overall operation in which a terminal measures neighboring cells and reports the same to a base station in an idle state in order to quickly activate carrier aggregation after switching from the idle state to an RRC connected state in an LTE system or NR system according to the disclosure.

FIG. 1F is a diagram illustrating the overall operation in which a terminal measures neighboring cells and reports the same to a base station in an idle state in order to quickly activate carrier aggregation after switching from an idle state to an RRC connected state in an LTE system or NR system according to the disclosure.

Reselecting a cell is a procedure in which a terminal determines the cell to camp on in the case where the quality of service with a serving cell is lower than the quality of service with a neighboring cell due to the movement of the terminal in the idle state (or idle mode). Handover is determined by a network (MME or a source eNB), whereas the cell reselection is determined by the terminal, based on measurement values. In addition, the cell reselected by a moving terminal may be a cell using the same LTE frequency as the serving cell on which the terminal is currently camping (intra-frequency cell), a cell using an LTE frequency different from that of the serving cell (inter-frequency cell), or a cell using another radio access technique (inter-RAT cell).

The terminal 1f-01 in an idle state performs a series of operations while camping on a serving cell (1f-05). First, the terminal may receive system information (SIB) broadcast by the base station 1f-02 of the serving cell (1f-10). The configuration and amount of system information may be different between the LTE system and the NR system. For example, the information related to measurement of neighboring cells in the intra-frequency measurement may be transmitted through SIB4 in LTE, and may be transmitted through SIB3 in NR. In addition, the information related to inter-frequency measurement may be transmitted through SIB5 in LTE, and may be transmitted through SIB4 in NR. The system information may include a threshold used to determine whether or not to measure neighboring cell signals, parameters used to calculate ranks of a serving cell and neighboring cells, and the like. In addition, for the intra-frequency measurement, since the carrier frequency is the same as the current serving cell, carrier frequency information is not separately signaled, but carrier frequency information on neighboring cells to be measured may be specified in the inter-frequency measurement. The following description with reference to the drawing will be made based on LTE, which may be applied to NR without significant change in functions thereof.

The terminal may switch to a connected state 1*f*-15 depending on whether or not there is data to be transmitted or received with respect to the serving cell being camped on, and if there is no transmission or reception of data in the connected state, the terminal may switch to an idle state. The (PCI) to be measured, information on the type of reference signal to be measured, information on a threshold, and the like. The valid cell list (validity area) for measuring neighboring cells may denote a list of cells for which the terminal is able to perform idle-mode measurement in the cell being camped on, which may indicate that the idle-mode measurement can be processed in the corresponding cell. The parameters of the ASN.1 code below may be referred to, and for reference, the configuration for measuring an NR cell may be obtained in a similar manner.

```
RRCConnectionRelease-v1530-IEs ::= SEQUENCE {
    drb-ContinueROHC-r15                                ENUMERATED {true}
        OPTIONAL,         -- Cond UP-EDT
    nextHopChainingCount-r15                            NextHopChainingCount
        OPTIONAL,         -- Cond UP-EDT
    measIdleConfig-r15
    MeasIdleConfigDedicated-r15     OPTIONAL, -- Need ON
    rrc-InactiveConfig-r15                              RRC-InactiveConfig-r15
        OPTIONAL,         -- Need OR
    cn-Type-r15
    ENUMERATED {epc,fivegc}              OPTIONAL, -- Need OR
    nonCriticalExtension                                RRCConnectionRelease-v1540-IEs
                                                        OPTIONAL
}
SystemInformationBlockType5 ::=                         SEQUENCE {
    interFreqCarrierFreqList                            InterFreqCarrierFreqList,
    ...,
    [[      measIdleConfigSIB-r15                              MeasIdleConfigSIB-r15
                OPTIONAL    -- Need OR
    ]]
}
MeasIdleConfigSIB-r15 ::= SEQUENCE {
    measIdleCarrierListEUTRA-r15 EUTRA-CarrierList-r15,
    ...
}
MeasIdleConfigDedicated-r15 ::= SEQUENCE {
    measIdleCarrierListEUTRA-r15 EUTRA-CarrierList-r15
        OPTIONAL,    -- Need OR
    measIdleDuration-r15            ENUMDERATED {sec10, sec30, sec60, sec120,
            sec180, sec240, sec300, spare},
    ...
}
MeasIdleCarrierEUTRA-r15::=                             SEQUENCE {
    carrierFreq-r15                                          ARFCN-ValueEUTRA-r9,
    allowedMeasBandwidth-r15                            AllowedMeasBandwidth,
    validtyArea-r15                                          CellList-r15
                OPTIONAL,    -- Need OR
    measCellList-r15                                         CellList-r15
                OPTIONAL,    -- Need OR
    reportQuantities                                    ENUMERATED {rsrp, rsrq, both},
    qualityThreshold-r15                                SEQUENCE {
        idleRSRP-Threshold-r15                                   RSRP-Range
                    OPTIONAL,    -- Need OR
        idleRSRQ-Threshold-r15                                   RSRQ-Range-r13
                    OPTIONAL    -- Need OR
    }
                                             OPTIONAL,    -- Need OR
    ...
}
CellList-r15 ::= SEQUENCE (SIZE (1.. maxCellMeasIdle-r15)) OF PhysCellIdRange
``` switching may be determined and indicated by the base station, and may be indicated through an RRC connection release message as described in step 1*f*-20.

The base station may instruct the terminal to measure neighboring cells even in the idle state, and the message may include measurement configuration for measuring neighboring cells. In this case, the measurement configuration may provide frequency information in the form of a list used for idle measurement. More specifically, the measurement configuration may include at least one piece of information on a carrier frequency, bandwidth information, information on a valid cell list {physical cell indexes (PCIs)} for measuring neighboring cells in the idle mode, information on a cell list As can be seen from the above RRC ASN.1 code, the configuration for measuring neighboring cells in the idle state may be transmitted through an SIB (hereinafter, "SIB5" will be described for example) or an RRC release message. Transmission using the SIB5 and transmission using the RRC release message are different in that SIB5 provides only inter-carrier frequency information (list) to be measured, and the RRC release message may include inter-carrier frequency information (list) to be measured and the duration of a timer indicating the time during which the measurement is performed in the idle mode ("measidleDuration-r15").

Fundamentally, the RRC release message may be dedicatedly used to instruct the terminal to perform idle-mode measurement and to trigger the operation, and SIB5 may provide the corresponding configuration in order to apply the same configuration to the corresponding serving cell. In the case where the inter-carrier frequency information is configured through the SIB5, the base station may omit the configuration of inter-carrier frequency information to be measured in the idle state with respect to the RRC release message. If both SIB5 and the RRC release message include the inter-carrier frequency information to be measured in the idle state, the information included in the RRC release message may have priority.

In step 1f-20, upon receiving the RRC release message including the information indicating measurement of neighboring cells in the idle state, the terminal starts measuring the configured frequencies and cells in the idle state and operates an idle-state cell measurement timer T331 in step 1f-25. Thereafter, the timer T331 operates, and the terminal performs cell measurement in the idle state for the duration of the timer ("measidleDuration-r15"). If the timer expires, the terminal stores the last measurement value for the configured neighboring cells in a buffer thereof.

terminal stops the timer T331 and identifies whether or not the serving cell is able to receive the idle-mode measurement value and quickly process the same into CA.

Whether or not the serving cell is able to receive the idle-mode measurement value and quickly process the same into CA may be indicated by the field "idleModeMeasurements" in SIB2. Thus, the terminal may determine whether or not to report the presence of the measurement value in the idle mode according to the indication of "idleModeMeasurements" in SIB2. If it is determined that the serving cell in the connected state with the terminal is able to receive the idle-mode measurement value and quickly process the same into CA, the terminal transmits, to the serving cell, an RRC connection setup complete message including an indicator indicating that the terminal stores measurement values of the neighboring cells measured in the idle state in step 1f-55.

```
RRCConnectionSetupComplete-v1530-IEs ::= SEQUENCE {
    logMeasAvailableBT-r15                          ENUMERATED {true}
                        OPTIONAL,
    logMeasAvailableWLAN-r15        ENUMERATED {true}
                        OPTIONAL,
    idleMeasAvailable-r15           ENUMERATED {true}
                        OPTIONAL,
    flightPathInfoAvailable-r15     ENUMERATED {true}
                        OPTIONAL,
    connectTo5GC-r15                                ENUMERATED {true}
                        OPTIONAL,
    registeredAMF-r15                               RegisteredAMF-r15
                        OPTIONAL,
    s-NSSAI-List-r15                                SEQUENCE (SIZE
(1..maxNrofS-NSSAI-r15)) OF S-NSSAI-r15 OPTIONAL,
    ng-5G-S-TMSI-Bits-r15           CHOICE {
        ng-5G-S-TMSI-r15                            NG-5G-S-TMSI-r15,
        ng-5G-S-TMSI-Part2-r15                      BIT STRING (SIZE (8))
    }
    OPTIONAL,
    nonCriticalExtension            RRCConnectionSetupComplete-v1540-IEs
                        OPTIONAL
}
```

40

The serving cell receiving the message may recognize that there are measured values of the neighboring cells measured by the terminal in the idle state, and may transmit, to the terminal, a UE information request message requesting the measured value information in step 1f-60.

```
UEInformationRequest-v1530-IEs ::= SEQUENCE {
    idleModeMeasurementReq-r15              ENUMERATED {true}
                        OPTIONAL,    -- Need ON
    flightPathInfoReq-r15                   FlightPathInfoReportConfig-r15
            OPTIONAL,       -- Need ON
    nonCriticalExtension                    SEQUENCE { }
                        OPTIONAL
}
```

If the terminal switches to an RRC connected state before the timer T331 expires during the operation of the timer T331 (for example, if the terminal performs a random access procedure to the serving cell in steps 1f-30 to 1f-45, and switches to the RRC connected state in step 1f-50), the The terminal receiving the message may report the channel measurement values to the base station by transmitting a UE information response message including the channel measurement values of the serving cell and the neighboring cells stored by the terminal in step 1f-65.

```
UEInformationResponse-v1530-IEs ::= SEQUENCE {
    measResultListIdle-r15          MeasResultListIdle-r15
        OPTIONAL,
```

-continued

```
        flightPathInfoReport-r15                   FlightPathInfoReport-r15
            OPTIONAL,
        nonCriticalExtension                       SEQUENCE { }
                            OPTIONAL
}
MeasResultListIdle-r15 ::= SEQUENCE (SIZE (1..maxIdleMeasCarriers-r15)) OF
MeasResultIdle-r15
MeasResultIdle-r15 ::= SEQUENCE {
        measResultServingCell-r15                  SEQUENCE {
            rsrpResult-r15                         RSRP-Range,
            rsrqResult-r15                         RSRQ-Range-r13
        },
        measResultNeighCells-r15       CHOICE {
            measResultIdleListEUTRA-r15        MeasResultIdleListEUTRA-r15,
            ...
        }
                                                   OPTIONAL,
        ...
}
MeasResultIdleListEUTRA-r15 ::= SEQUENCE (SIZE (1..maxCellMeasIdle-r15)) OF
MeasResultIdleEUTRA-r15
MeasResultIdleEUTRA-r15 ::= SEQUENCE {
        carrierFreq-r15                            ARFCN-ValueEUTRA-r9,
        physCellId-r15                             PhysCellId,
        measResult-r15                             SEQUENCE {
            rsrpResult-r15                             RSRP-Range,
            rsrqResult-r15                             RSRQ-Range-r13
        },
        ...
}
```

As can be seen from the ASN.1 code above, the UE information response message may include a channel measurement value (RSRP or RSRP) of the serving cell and measurement values of the neighboring cells indicated to be measured. More specifically, the UE information response message may include at least one of frequency information on the neighboring cells, PCI IDs, and channel measurement values (RSRP or RSRP) of corresponding cells. For reference, the current LTE limits the number of frequencies to be measured in the idle state to three, and limits the maximum number of cells that can be measured for each frequency to eight.

Upon receiving the measurement values of the neighboring cells in the idle state from the terminal, the base station may provide the terminal with SCell configuration information for CA in step 1*f*-70. The base station may refer to the content reported by the terminal in the step, and may activate CA by transmitting the activation MAC CE for the SCell for reasons such as an increase in the amount of data transmitted by the terminal in the subsequent step.

FIG. 1E and FIG. 1F in the disclosure show the difference between the method of activating CA in the existing LTE system and the procedure of activating CA using measurement values of neighboring cells measured in an idle state. Since a process of configuring the measurement of neighboring cells and measuring the same can be omitted in the connected state, the terminal is able to switch to the connected state and perform quick configuration of CA.

Figure 1G:
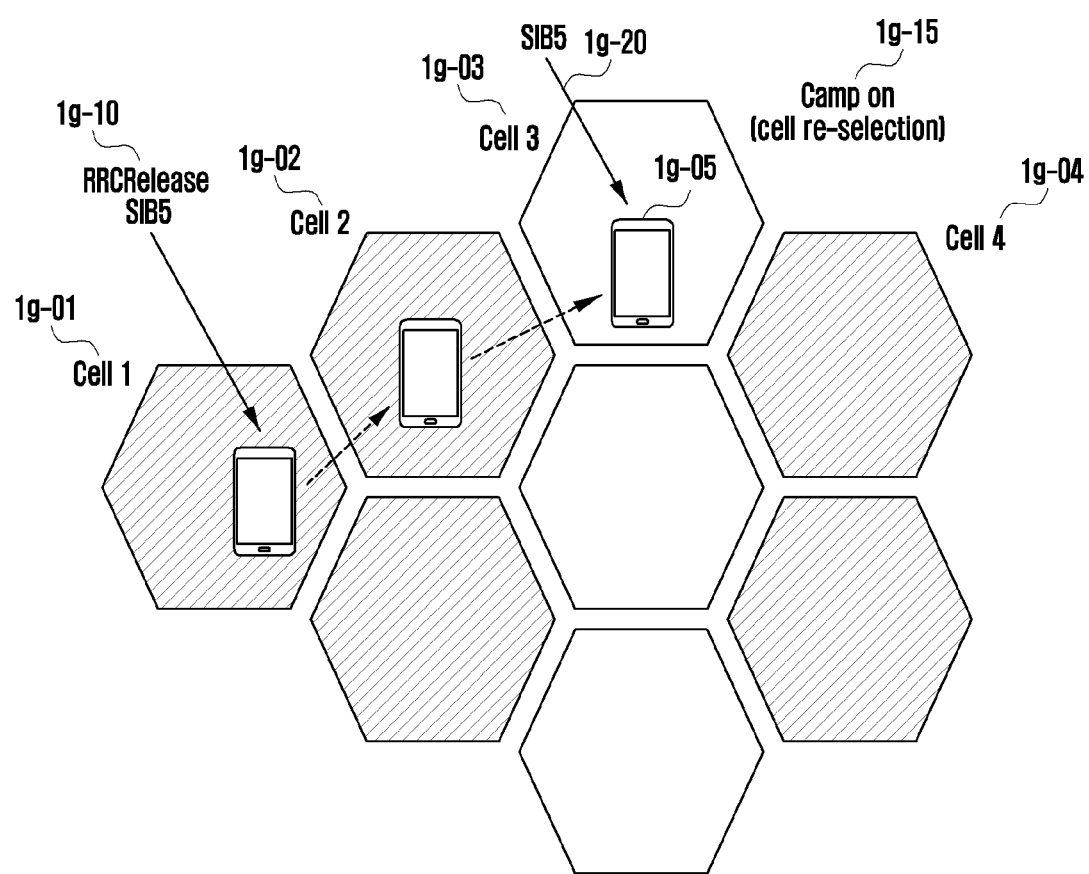
FIG. 1G is a diagram illustrating a conventional idle-mode measurement operation of a terminal when reselecting a cell for reference in the disclosure.

FIG. 1G is a diagram illustrating a conventional idle-mode measurement operation of a terminal when reselecting a cell according to the disclosure.

A terminal 1*g*-05 transmitting/receiving data in a connected state in serving cell 1 (1*g*-01) may receive an RRC connection release message (or RRC release message) 1*g*-10 for reasons, such as interruption of transmission/reception of data, thereby switching to an idle mode. A corresponding base station may instruct the terminal to switch to the idle state while instructing the terminal to perform channel measurement of neighboring cells even in the idle mode. The information for measuring the neighboring cells in the idle mode (e.g., at least one of a measurement frequency, a cell list, or a duration of a timer T331) may be included in the RRC release message 1*g*-10.

Thereafter, the terminal may move and wait in the idle state, and may move to Cell 2 (1*g*-02) and Cell 3 (1*g*-03) in the idle state. The terminal may camp on Cell 3 (1*g*-03), and may attempt to connect to a corresponding serving cell such as Cell 4 1*g*-04. The terminal performs measurement, based on an idle-mode measurement list previously received through the RRC release message 1*g*-10. If SIB2 of Cell 3 (1*g*-03) has an indicator indicating that the idle-mode measurement value is able to be processed, the terminal may perform measurement in the idle state after the connection, and may report stored measurement values.

If the RRC release message 1*g*-10 includes only the duration of a timer T331, excluding the information on the idle-mode measurement frequencies/cells in step 1*g*-10, the terminal may reselect Cell 3 (1*g*-03), and may then receive the system information (acquiring SIB2 and SIB5 information) from the corresponding cell {Cell 3 (1*g*-03)} in step 1*g*-20, thereby storing information on the idle-mode measurement frequencies/cells. However, in the above operation, the terminal also receives the information on the idle-mode measurement frequencies/cells through the system information of the previous serving cell {Cell 1 (1*g*-01)}, and after the cell reselection, the terminal may receive and store new information in relation thereto through Cell 3 (1*g*-03). The current LTE standard states that both pieces of information are stored and that the terminal performs an operation of measuring neighboring cells in the idle mode. However, in the case where the measurement frequencies/cell lists provided by two serving cells are different from each other, the terminal measures a greater number of frequencies and cells, which complicates the operation of the terminal. In addition, since the current standard allows measurement of up to three measurement frequencies and up to eight cells for each frequency, a required operation may not be performed properly.

That is, if the RRC release message 1g-10 includes only the duration of a timer T331, excluding the information on the idle-mode measurement frequencies/cells, the terminal reselects Cell 3 (1g-03), and then replaces (or updates) the information on the idle-mode measurement frequencies/cells, which is received and stored through SIB5 in the existing serving cell, by the information received through SIB5 in the new serving cell 3 (1g-03). As described above, the above operation may be applied to LTE and NR in the same manner, and the inter-frequency information may be provided through SIB4, instead of SIB5, in NR. In addition, in NR, the information on the idle-mode measurement frequencies/cells may include new parameters such as sub-carrier spacing information, as well as features of the NR system.

Figure 1H:
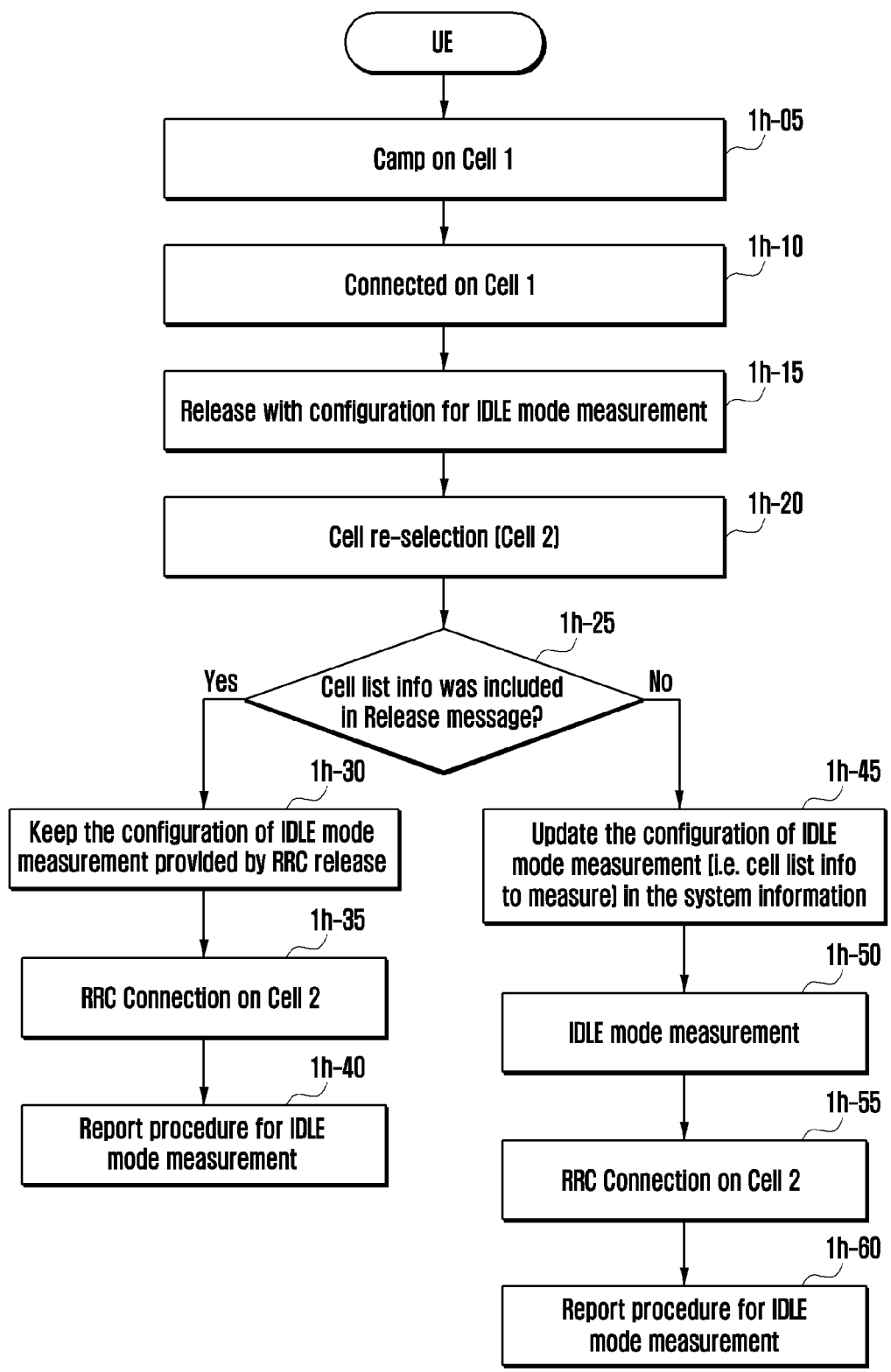
FIG. 1H is a diagram illustrating a method in which a terminal updates idle-mode measurement information when reselecting a cell according to Embodiment 1 of the operation of a terminal proposed in the disclosure.

FIG. 1H is a diagram illustrating a method in which a terminal updates idle-mode measurement information when reselecting a cell according to Embodiment 1 of the operation of a terminal proposed in the disclosure.

The embodiment is based on the overall operation of a terminal described with reference to FIGS. 1F and 1G, and proposes the operation of a terminal and a base station in the case where the terminal switches to an idle mode through an RRC release message and then performs idle-mode measurement, and the terminal reselects a cell.

The terminal may camp on a serving cell (Cell 1) in step 1h-05, and may then establish an RRC connection with the corresponding cell, thereby transmitting/receiving data, in step 1h-10. The terminal transmitting/receiving data in the connected state (1h-10) may receive an RRC connection release message for reasons, such as interruption of transmission/reception of data, thereby switching to an idle mode (1h-15).

The base station/serving cell (Cell 1) may instruct the terminal to switch to the idle state while instructing the terminal to perform channel measurement with respect to neighboring cells (inter-frequency measurement) even in the idle mode. Configuration information for channel measurement in the idle mode (e.g., at least one of measurement frequencies, a cell list, or a duration of a timer T331) may be included in the RRC release message. The RRC release message may include only the duration of a timer T331, excluding the information on the idle-mode measurement frequencies/cells. In this case, the base station may include the information on the idle-mode measurement frequencies/cells in SIB5 (SIB4 in the case of NR), and may then transmit the same to the terminal, and the terminal may store and use the same.

The terminal may perform channel measurement in the idle mode for the configured frequencies and cells before the timer T331 expires.

The terminal may perform an operation of reselecting a serving cell for reasons such as movement of the terminal, a change in the channel status, and the like {for example, reselecting a specific serving cell (Cell 2)} in step 1h-20.

When the terminal reselects a cell, the idle-mode channel measurement operation of the terminal may differ depending on the previously received message indicating the idle-mode measurement configuration.

In step 1h-25, the terminal may perform different operations depending on the received message indicating the idle-mode measurement configuration.

If the terminal is provided both with a list of frequencies/cells to be measured in the idle mode and with the duration of a timer T331 through the RRC release message, the terminal may perform an idle-mode measurement operation by applying the information (configuration) in step 1h-30. If the timer T331 expires during the measurement operation, the terminal may record the most recently measured neighboring frequency/cell measurement information.

Afterwards, if the terminal performs a connection procedure with a corresponding serving cell (Cell 2) and receives msg4 (an RRC connection setup message) in step 1h-35, the terminal may identify whether or not the serving cell (Cell 2) supports processing of the idle-mode measurement values and quick configuration and activation of CA through system information (SIB2). If the indicator indicates that the base station supports the operation, the terminal may include an indicator indicating that there are idle-mode measurement values in msg5 (an RRC connection setup complete message), and may transmit the same. Thereafter, the terminal and the base station performs a procedure for reporting the idle-mode measurement values in step 1h-40, which is performed according to the operations in steps 1f-55 to 1f-70 in FIG. 1F.

Meanwhile, if the terminal receives only the duration of a timer T331 through an RRC release message in step 1h-25, and if the terminal receives the list of frequencies/cells to be measured in the idle mode and configuration information thereof through the system information of the previous serving cell (Cell 1), the terminal may again receive system information (SIB5 in LTE and SIB4 in NR) through the new serving cell (Cell 2), and may update/replace the list of frequencies/cells to be measured in the idle mode and configuration information thereof, which are received through the system information of the previous serving cell (Cell 1), by using the information received through the system information of the new serving cell (Cell 2) in step 1h-45.

According to the current LTE standard, both the information received through the system information of Cell 1 and the information received through the system information of Cell 2 are stored, and then the terminal performs an operation of measuring neighboring cells in the idle mode. However, if the measurement frequency/cell lists provided by two serving cells are different from each other, the terminal measures a greater number of frequencies and cells, which complicates the operation of the terminal. In addition, since the current standard allows measurement of up to three measurement frequencies and up to eight cells for each frequency, a required operation may not be performed properly.

If the timer T331 is still operating in step 1h-50, the terminal may perform an operation of measuring neighboring frequencies/cells in the idle mode, based on the newly updated/replaced idle-mode measurement configuration. If the timer T331 expires during the operation, the terminal may record the most recently measured neighboring-frequency/cell measurement information.

If the terminal performs a connection procedure with a corresponding serving cell (Cell 2) and receives msg4 (an RRC connection setup message) in step 1h-55, the terminal may identify whether or not the serving cell (Cell 2) supports processing of the idle-mode measurement values and quick configuration and activation of CA through system information (SIB2). If the indicator indicates that the base station supports the operation, the terminal may include an indicator indicating that there are idle-mode measurement values in msg5 (an RRC connection setup complete message), and may transmit the same. Thereafter, the terminal and the base station perform a procedure for reporting the idle-mode measurement values in step 1h-60, which is performed according to the operations in steps 1f-55 to 1f-70 in FIG. 1F.

Figure 1I:
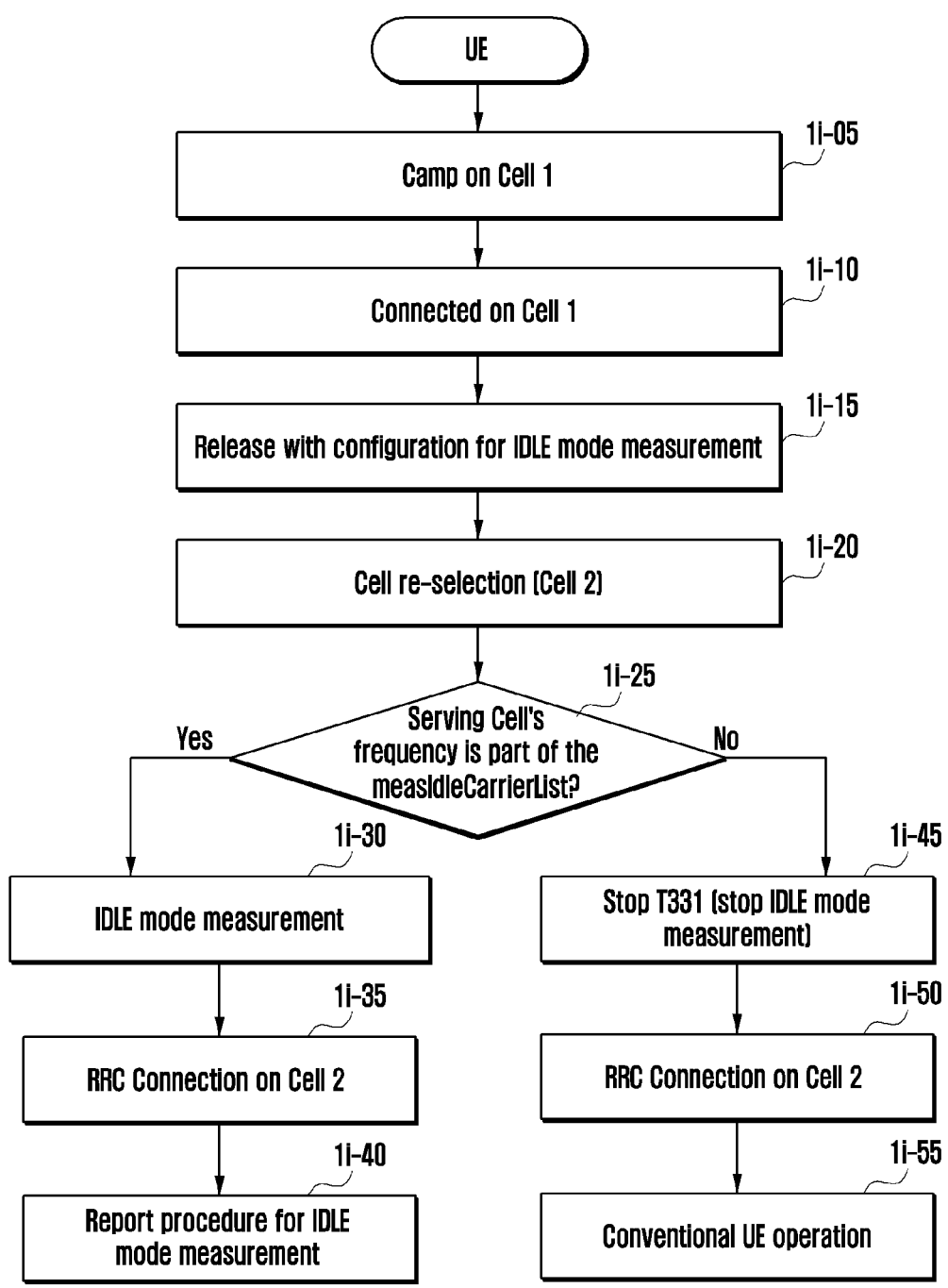
FIG. 1I is a diagram illustrating a method of performing idle-mode measurement, based on frequency information of a base station supporting an enhanced CA function, according to Embodiment 2 of the operation of a terminal proposed in the disclosure.

FIG. 1I is a diagram illustrating a method of performing measurement in an idle mode, based on frequency information of a base station supporting an enhanced CA function, according to Embodiment 2 of the operation of a terminal proposed in the disclosure.

The embodiment is based on the overall operation of a terminal described with reference to FIGS. 1F and 1G, and proposes the operation of a terminal and a base station in the case where the terminal switches to an idle mode through an RRC release message and then performs idle-mode measurement, and the terminal reselects a cell.

The terminal may camp on a serving cell (Cell 1) in steps 1i-05, and may then establish an RRC connection with the corresponding cell, thereby transmitting/receiving data, in step 1i-10. The terminal transmitting/receiving data in the connected state (1i-10) may receive an RRC connection release message for reasons, such as interruption of transmission/reception of data, thereby switching to an idle mode (1i-15).

The base station/serving cell (Cell 1) may instruct the terminal to switch to the idle state while instructing the terminal to perform channel measurement with respect to neighboring cells (inter-frequency measurement) even in the idle mode. Configuration information for channel measurement in the idle mode (e.g., at least one of measurement frequencies, a cell list, or a duration of a timer T331) may be included in the RRC release message. The RRC release message may include only the duration of a timer, excluding the information on the idle-mode measurement frequencies/cells. In this case, the base station may include the information on the idle-mode measurement frequencies/cells in SIB5 (SIB4 in the case of NR), and may then transmit the same to the terminal, and the terminal may store and use the same. In the embodiment, the RRC release message includes information on a list of frequencies to be measured by the terminal in the idle mode.

As described in FIG. 1F, the configuration information for the existing measurement operation in the idle mode, that is, the information included when the base station instructs the terminal to measure neighboring cells even in the idle state may be provided as frequency information in the form of a list required to be measured in the idle mode. More specifically, the information may include at least one piece of information on the carrier frequency to be measured, bandwidth information, information on a valid cell list {physical cell indexes (PCIS)} for measuring neighboring cells in the idle mode, information on a cell list (PCI) to be measured, information on the type of reference signal to be measured, information on a threshold, and the like. The valid cell list (validity area) for measuring neighboring cells may denote a list of cells in which the terminal is able to perform idle-mode measurement in the cell being camped on, which may indicate that the idle-mode measurement can be processed in the corresponding cell.

However, referring to the frequency/cell configuration for the conventional idle-mode measurement, there is no indicator for determining whether or not the serving cell being camped on by the terminal is able to perform idle-mode measurement at the frequency level. For example, the terminal may receive an instruction of a specific cell, as a measurement object cell, having different frequency information and the same PCI. In this case, it is difficult to determine the cell supporting the idle-mode measurement operation in the current standard operation. Therefore, the embodiment proposes the following two methods in order to distinguish the cells above.

Idle-mode measurement support indication method 1: The terminal identifies whether or not a corresponding serving cell is supported through an idle-mode measurement support indicator (a 1-bit "idleModeMeasurements" indicator) of the system information broadcast by a serving cell camped on or reselected by the terminal (e.g., SIB2).

Idle-mode measurement support indication method 2: The base station provides valid frequency information ("ValidityFrequency") supporting the idle-mode measurement operation together with valid cell information ("ValidityArea") when instructing the idle-mode measurement through an RRC release message. The NR frequency information may be provided separately. That is, "measidleCarrierListEUTRA" and "measidleCarrierListNR" are provided separately, and corresponding configuration parameters are provided.

Signaling method 1: This independently provides "ValidityFrequency" and "Validity Area" as separate parameters.

Signaling method 2: Signaling is performed by associating frequency with cell information (valid cell information for each frequency).

After step 1i-15, the terminal may perform channel measurement on the configured frequencies and cells in the idle mode before the timer T331 expires. In the case where an operation of reselecting a specific serving cell (Cell 2) is performed for reasons such as movement of a terminal, a change in the channel status, and the like in step 1i-20, the terminal may perform different operations depending on whether or not idle-mode measurement is supported in the serving cell (Cell 2).

Therefore, in step 1i-25, the terminal may identify whether or not the serving cell supports idle-mode measurement, and may perform different operations. If the serving cell (Cell 2) reselected by the terminal supports idle-mode measurement, the terminal performs an idle-mode measurement operation by applying the information (configuration) in step 1i-30. The method of identifying whether or not idle-mode measurement is supported may include at least one of idle-mode measurement support indication method 1 or idle-mode measurement support indication method 2 described in the embodiment. If the timer T331 expires during the corresponding operation, the terminal may record the most recently measured neighboring-frequency/cell measurement information.

If the terminal performs a connection procedure with a corresponding serving cell (Cell 2) and receives msg4 (an RRC connection setup message) in step 1i-35, the terminal may identify whether or not the serving cell (Cell 2) supports processing of the idle-mode measurement values and quick configuration and activation of CA through system information (SIB2). If the indicator indicates that the base station supports the operation, the terminal may include an indicator indicating that there are idle-mode measurement values in msg5 (an RRC connection setup complete message), and may transmit the same. Thereafter, the terminal and the base station performs a procedure for reporting the idle-mode measurement values in step 1i-40, which is performed according to the operations in steps 1f-55 to 1f-70 in FIG. 1F.

Meanwhile, if the serving cell (Cell 2) reselected by the terminal does not support the idle-mode measurement in 1i-25, the terminal stops operation of the timer T331, thereby stopping the idle-mode measurement in step 1i-45. The method of identifying whether or not the idle-mode measurement is supported may include at least one of idle-mode measurement support indication method 1 or idle-mode measurement support indication method 2 described in the embodiment.

In addition, the disclosure is different from the operation of an existing terminal in that the terminal stops the idle-mode measurement if the terminal checks the frequency/cell of the serving cell (Cell 2) after cell reselection and identifies that the corresponding cell does not support the idle-mode measurement. That is, according to the existing operation, even if a serving cell is reselected by the terminal, the terminal continues to perform the idle-mode measurement, whereas the measurement is stopped in the disclosure if the serving cell does not perform the idle-mode measurement.

The terminal may perform a procedure of connecting to the serving cell (Cell 2), and is then aware that the serving cell (Cell 2) does not support the idle-mode measurement in step 1i-50. Therefore, the terminal may omit a procedure of reporting the idle-mode measurement, and may perform the procedure according to existing LTE and NR in step 1i-55.

According to the operation proposed in the embodiment, the terminal is aware of whether or not a corresponding serving cell supports the idle-mode measurement by receiving or identifying a valid frequency and a valid cell configuration in advance, and if it is identified that the corresponding serving cell does not support idle-mode measurement, the terminal stops the idle-mode measurement operation. Alternatively, the terminal may maintain the previous operation of the terminal (even if it is identified that the corresponding serving cell does not support idle-mode measurement, the terminal continues to perform the idle-mode measurement, identifies an indicator of SIB2 of the serving cell, and omits a procedure of reporting the idle-mode measurement).

In addition, the base station may independently manage the idle-mode measurement and idle-mode measurement reporting of the terminal through the following method. This method may be used in the case where base stations are mixed such that a specific base station does not upgrade support for an operation related to idle-mode measurement and only some other base stations support the same.

1. If the serving cell does not provide idle-mode measurement-related configuration as system information, the terminal maintains the idle-mode measurement-related configuration in the system information (or RRC release) received from the previous serving cell.
2. If a cell provides system information including empty idle-mode measurement-related configuration (that is, if the cell broadcasts the idle-mode measurement-related configuration excluding frequency/cell-related configuration), the terminal recognizes that the cell does not support idle-mode measurement, thereby stopping the timer T331 and stopping the idle-mode measurement operation.

Figure 1J:
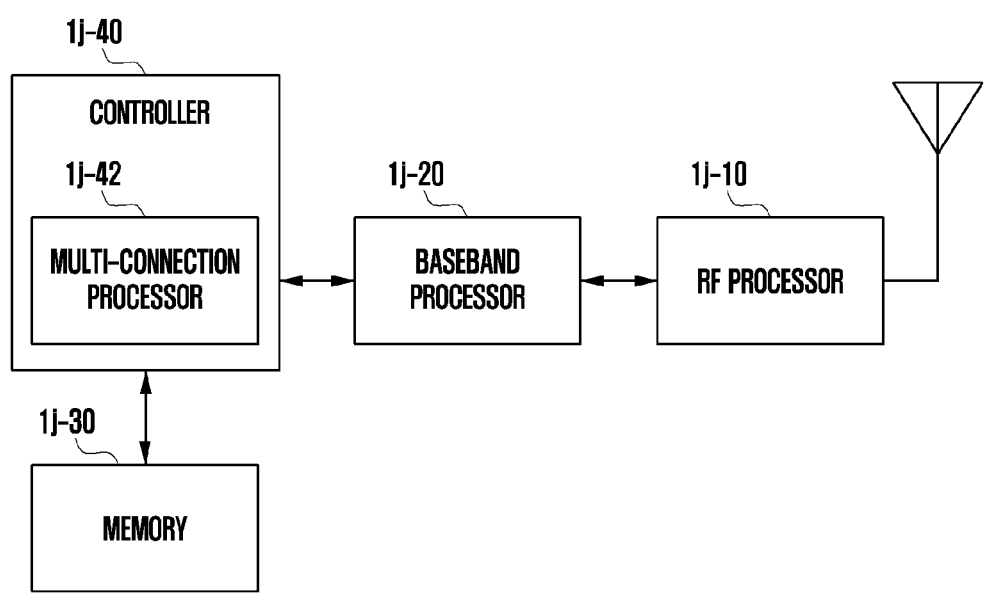
FIG. 1J is a block diagram illustrating the internal structure of a terminal to which the disclosure is applied.

FIG. 1J is a block diagram illustrating the internal structure of a terminal according to the disclosure.

Referring to FIG. 1J, the terminal includes a radio frequency (RF) processor 1j-10, a baseband processor 1j-20, a storage unit 1j-30, and a controller 1j-40.

The RF processor 1j-10 performs a function of transmitting and receiving a signal through a radio channel, such as band conversion and amplification of a signal. That is, the RF processor 1j-10 up-converts a baseband signal provided from the baseband processor 1j-20 to an RF band signal to thus transmit the same through an antenna, and down-converts an RF band signal received through the antenna to a baseband signal. For example, the RF processor 1j-10 may include a transmission filter, a reception filter, an amplifier, a mixer, an oscillator, a digital-to-analog converter (DAC), an analog-to-digital converter (ADC), and the like. Although only one antenna is illustrated in FIG. 1J, the terminal may have a plurality of antennas. In addition, the RF processor 1j-10 may include a plurality of RF chains. Further, the RF processor 1j-10 may perform beamforming. To perform beamforming, the RF processor 1j-10 may adjust the phases and magnitudes of signals transmitted and received through a plurality of antennas or antenna elements. In addition, the RF processor may perform MIMO, and may receive multiple layers when performing the MIMO operation.

The baseband processor 1j-20 performs a function of conversion between a baseband signal and a bit string according to the physical layer specification of the system. For example, when transmitting data, the baseband processor 1j-20 encodes and modulates transmission bit strings, thereby generating complex symbols. In addition, when receiving data, the baseband processor 1j-20 demodulates and decodes a baseband signal provided from the RF processor 1j-10 to thus recover reception bit strings. For example, in the case where an orthogonal frequency division multiplexing (OFDM) scheme is applied, when transmitting data, the baseband processor 1j-20 generates complex symbols by encoding and modulating transmission bit strings, maps the complex symbols to subcarriers, and then configures OFDM symbols through an inverse fast Fourier transform (IFFT) operation and cyclic prefix (CP) insertion. In addition, when receiving data, the baseband processor 1j-20 divides the baseband signal provided from the RF processor 1j-10 into OFDM symbol units, restores the signals mapped to the subcarriers through a fast Fourier transform (FFT) operation, and then restores reception bit strings through demodulation and decoding.

The baseband processor 1j-20 and the RF processor 1j-10 transmit and receive signals as described above. Accordingly, the baseband processor 1j-20 and the RF processor 1j-10 may be referred to as a "transmitter", a "receiver", a "transceiver", or a "transceiver". Further, at least one of the baseband processor 1j-20 and the RF processor 1j-10 may include a plurality of communication modules in order to support a plurality of different radio access techniques. In addition, at least one of the baseband processor 1j-20 and the RF processor 1j-10 may include different communication modules to process signals in different frequency bands. For example, the different radio access techniques may include a wireless LAN (e.g., IEEE 802.11), a cellular network (e.g., LTE), and the like. In addition, the different frequency bands may include super-high frequency (SHF) (e.g., 2·NRHz or NRHz) bands or millimeter wave (e.g., 60 GHz) bands.

The storage unit 1j-30 stores data such as fundamental programs, application programs, and configuration information for the operation of the terminal. In particular, the storage unit 1j-30 may store information related to a second access node that performs wireless communication using a second radio access technique. In addition, the storage unit 1j-30 provides the stored data in response to a request of the control unit 1j-40.

The controller 1j-40 controls the overall operation of the terminal. For example, the controller 1j-40 transmits and receives signals through the baseband processor 1j-20 and the RF processor 1j-10. In addition, the controller 1j-40 records and reads data in and from the storage unit 1j-30. To this end, the controller 1j-40 may include at least one multi-connection processor 1j-42. For example, the controller 1j-40 may include a communication processor (CP) for controlling communication and an application processor (AP) for controlling higher layers such as application programs.

Figure 1K:
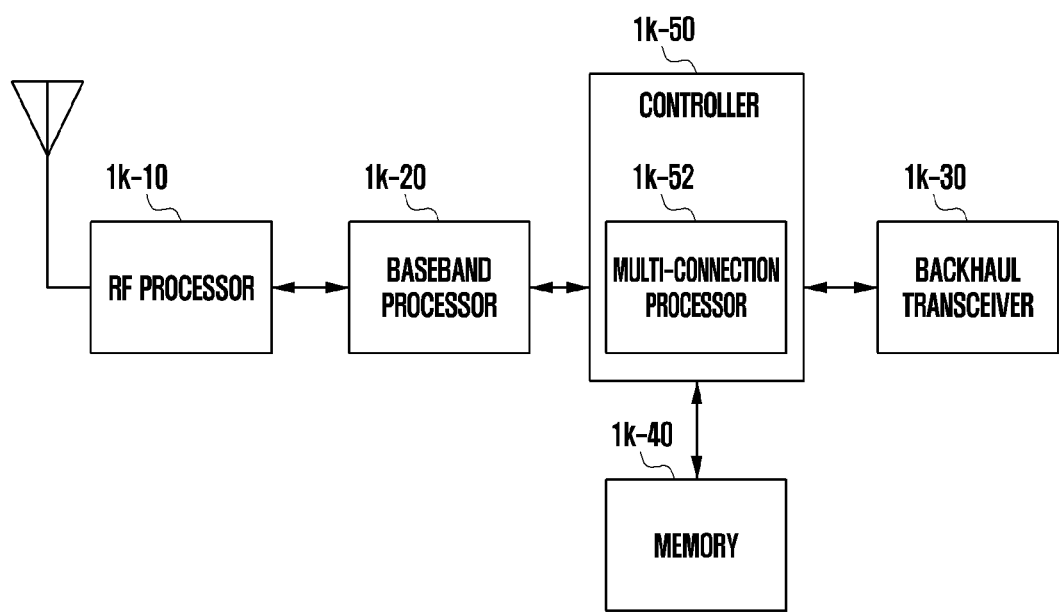
FIG. 1K is a block diagram illustrating the configuration of a base station according to the disclosure.

FIG. 1K is a block diagram illustrating the configuration of a base station according to the disclosure.

As shown in FIG. 1K, the base station includes an RF processor 1k-10, a baseband processor 1k-20, a backhaul transceiver 1k-30, a storage unit 1k-40, and a controller 1k-50.

The RF processor 1k-10 performs a function of transmitting and receiving signals, such as band conversion and amplification of a signal, through a radio channel. That is, the RF processor 1k-10 up-converts a baseband signal provided from the baseband processor 1k-20 to an RF band signal to thus transmit the same through an antenna, and down-converts an RF band signal received through the antenna to a baseband signal. For example, the RF processor 1k-10 may include a transmission filter, a reception filter, an amplifier, a mixer, an oscillator, a DAC, an ADC, and the like. Although only one antenna is shown in the drawing, the first access node may have a plurality of antennas. In addition, the RF processor 1k-10 may include a plurality of RF chains. Further, the RF processor 1k-10 may perform beamforming. To perform beamforming, the RF processor 1k-10 may adjust the phases and magnitudes of signals transmitted and received through a plurality of antennas or antenna elements. The RF processor may perform a downlink MIMO operation by transmitting one or more layers.

The baseband processor 1k-20 performs a function of conversion between a baseband signal and a bit string according to the physical layer specification of a first radio access technique. For example, when transmitting data, the baseband processor 1k-20 encodes and modulates transmission bit strings, thereby generating complex symbols. In addition, when receiving data, the baseband processor 1k-20 demodulates and decodes a baseband signal provided from the RF processor 1k-10 to thus recover reception bit strings. For example, in the case where an OFDM scheme is applied, when transmitting data, the baseband processor 1k-20 generates complex symbols by encoding and modulating transmission bit strings, maps the complex symbols to subcarriers, and then configures OFDM symbols through the IFFT operation and CP insertion. In addition, when receiving data, the baseband processor 1k-20 divides the baseband signal provided from the RF processor 1k-10 into OFDM symbol units, restores the signals mapped to the subcarriers through the FFT operation, and then restores reception bit strings through demodulation and decoding. The baseband processor 1k-20 and the RF processor 1k-10 transmit and receive signals as described above. Accordingly, the baseband processor 1k-20 and the RF processor 1k-10 may be referred to as a "transmitter", a "receiver", a "transceiver", a "transceiver", or a "wireless transceiver".

The backhaul transceiver 1k-30 provides an interface for performing communication with other nodes in the network. That is, the backhaul transceiver 1k-30 converts a bit string, transmitted from the primary base station to another node, such as a secondary base station, a core network, etc., into a physical signal, and converts physical signals received from other nodes into bit strings.

The storage unit 1k-40 stores data such as fundamental programs, application programs, and configuration information for the operation of the base station. In particular, the storage unit 1k-40 may store information about bearers allocated to a connected terminal, a measurement result reported from a connected terminal, and the like. In addition, the storage unit 1k-40 may store information that is a criterion for determining whether multiple connections are provided to the terminal or is released. In addition, the storage unit 1k-40 provides the stored data in response to a request from the controller 1k-50.

The controller 1k-50 controls the overall operation of the base station. For example, the controller 1k-50 transmits and receives signals through the baseband processor 1k-20 and the RF processor 1k-10 or the backhaul transceiver 1k-30. In addition, the controller 1k-50 records and reads data in and from the storage unit 1k-40. To this end, the controller 1k-50 may include at least one multi-connection processor 1k-52.

Figure 2A:
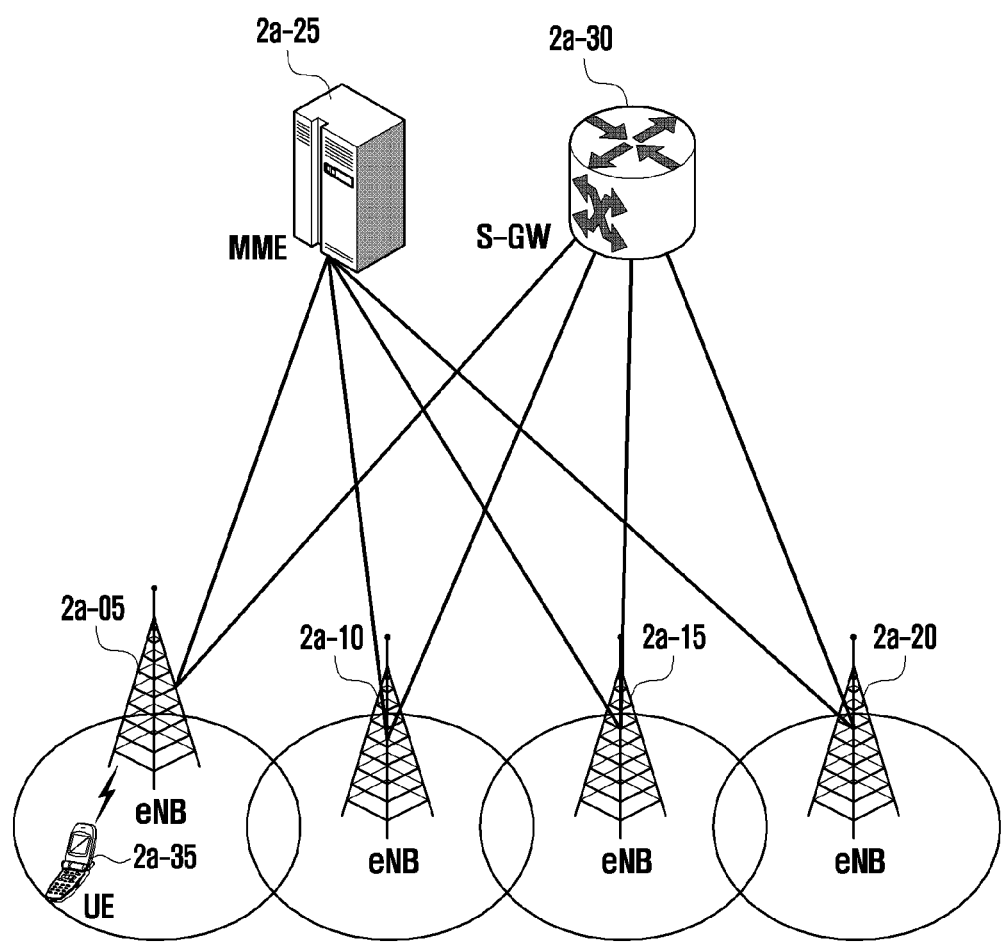
FIG. 2A is a diagram illustrating the structure of an LTE system according to an embodiment.

FIG. 2A is a diagram illustrating the structure of an LTE system according to an embodiment.

Referring to FIG. 2A, a radio access network of an LTE system includes Evolved Node Bs (hereinafter, referred to as "ENBs", "Node Bs", or "base stations") 2a-05, 2a-10, 2a-15, and 2a-20, a mobility management entity (MME) 2a-25, and a serving-gateway (S-GW) 2a-30. User equipment (hereinafter, referred to as "UE" or "terminal") 2a-35 accesses an external network through the ENBs 2a-05 to 2a-20 and the S-GW 2a-30.

In FIG. 2A, the ENB 2a-05 or 2a-20 may correspond to existing Node Bs of a universal mobile telecommunication system (UMTS). The ENB may be connected to the UE 2a-35 via a radio channel, and may play a more complex role than the existing Node B. In the LTE system, all user traffic including real-time services, such as voice-over-IP (VoIP) through the Internet protocol, may be served through a shared channel. Therefore, a device for collecting status information, such as buffer status, available transmission power status, and channel status of UEs, and performing scheduling is required. The ENBs 2a-05 to 2a-20 serve as such a device.

One ENB typically controls multiple cells. For example, in order to realize a data rate of 100 Mbps, the LTE system uses, as radio access technology, orthogonal frequency division multiplexing (OFDM) in, for example, a 20 MHz bandwidth. Further, an adaptive modulation and coding (AMC) scheme is applied to determine a modulation scheme and a channel coding rate in accordance with the channel status of a terminal. The S-GW 2a-30 is a device for providing data bearers, and may generate or remove data bearers under the control of the MME 2a-25. The MME is a device that performs various control functions, as well as a mobility management function for a terminal, and may be connected to a plurality of base stations.

Figure 2B:
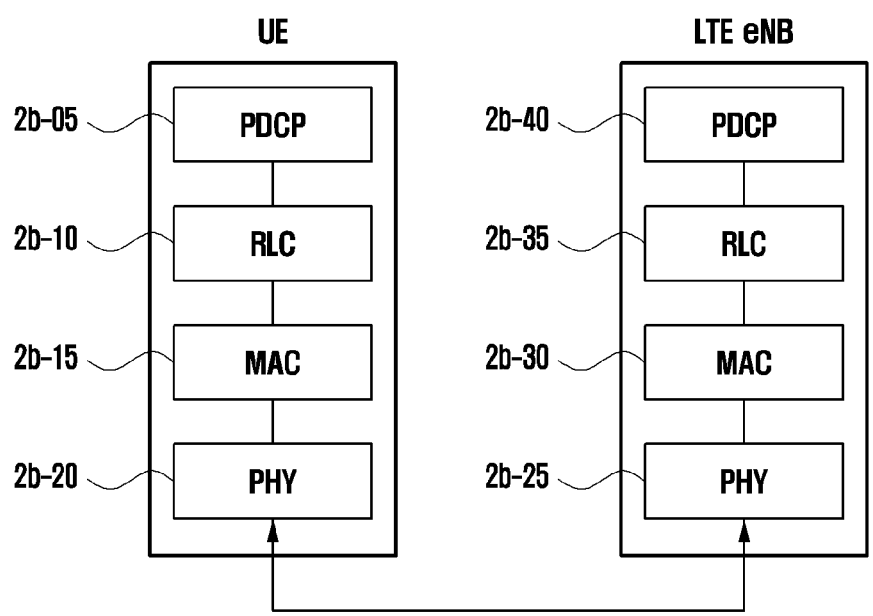
FIG. 2B is a diagram illustrating a radio protocol structure in an LTE system according to an embodiment.

FIG. 2B is a diagram illustrating a radio protocol structure in an LTE system according to an embodiment.

Referring to FIG. 2B, the radio protocol of an LTE system includes a packet data convergence protocol (PDCP) 2b-05 or 2b-40, a radio link control (RLC) 2b-10 or 2b-35, and a medium access control (MAC) 2b-15 or 2b-30 in a terminal and an ENB, respectively. The PDCP performs operations, such as IP header compression/decompression and the like. The primary functions of the PDCP are summarized as follows.

Header compression and decompression (ROHC only)
  Transfer of user data
  In-sequence delivery of higher-layer PDUs at PDCP re-establishment procedure for RLC AM
  Sequence reordering {for split bearers in DC (only support for RLC AM): PDCP PDU routing for transmission and PDCP PDU reordering for reception}
  Duplicate detection of lower-layer SDUs at PDCP re-establishment procedure for RLC AM
  Retransmission of PDCP SDUs at handover and, for split bearers in DC, of PDCP PDUs at PDCP data-recovery procedure, for RLC AM Ciphering and deciphering Timer-based SDU discard in uplink.

The radio link control (RLC) 2b-10 or 2b-35 reconfigures a PDCP packet data unit (PDU) to an appropriate size and performs ARQ operation and the like. The primary functions of the RLC are summarized as follows.

Data transfer function (transfer of higher-layer PDUs)

ARQ function {error correction through ARQ (only for AM data transfer)}

Concatenation, segmentation, and reassembly of RLC SDUs (only for UM and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MAC 2b-15 or 2b-30 is connected to a plurality of RLC entities configured in a single terminal, multiplexes RLC PDUs into MAC PDUs, and demultiplexes RLC PDUs from MAC PDUs. The primary functions of the MAC are summarized as follows.

Mapping between logical channels and transport channels

Multiplexing/demultiplexing of MAC SDUs belonging to one or different logical channels into/from transport blocks (TB) delivered to/from the physical layer on transport channels Scheduling information reporting HARQ function (error correction through HARQ)

Priority handling between logical channels of one UE

Priority handling between UEs by means of dynamic scheduling

MBMS service identification

Transport format selection

Padding

The physical layers 2b-20 and 2b-25 channel-code and modulate higher-layer data, and convert the same into OFDM symbols that are then transmitted through a radio channel, or demodulate OFDM symbols received through a radio channel and channel-decode the same, and then transmit the same to higher layers.

Figure 2C:
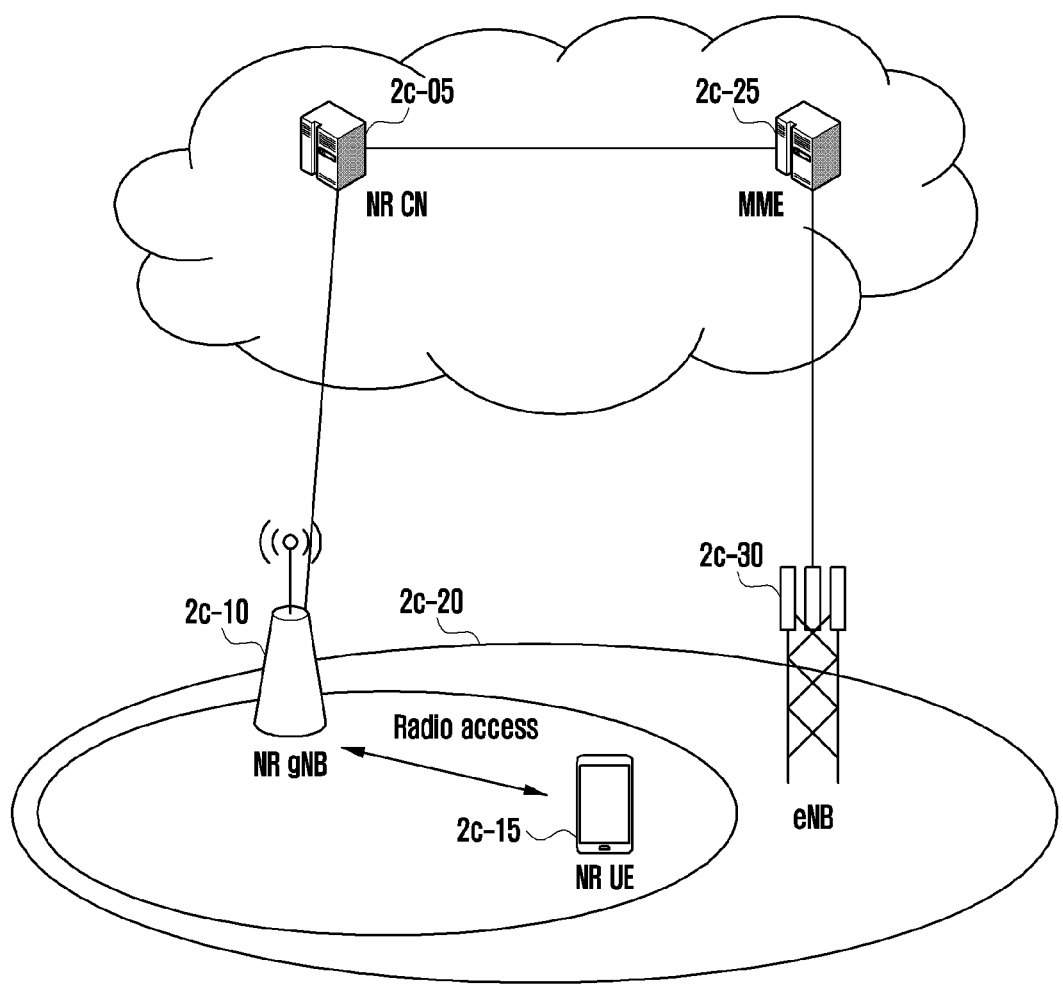
FIG. 2C is a diagram illustrating the structure of a next-generation mobile communication system according to an embodiment.

FIG. 2C is a diagram illustrating the structure of a next-generation mobile communication system according to an embodiment.

Referring to FIG. 2C, a radio access network of a next-generation mobile communication system (hereinafter, "NR" or "5G") includes a new radio node B (hereinafter, referred to as an "NR gNB" or an "NR base station") 2c-10 and a new radio core network (NR CN) 2c-05. New radio user equipment ("NR UE" or "terminal") 2c-15 accesses an external network through the NR gNB 2c-10 and the NR CN 2c-05.

In FIG. 2C, the NR gNB 2c-10 may correspond to an evolved Node B (eNB) in an existing LTE system. The NR gNB is connected to the NR UE 2c-15 through a radio channel, and may provide services superior to those of the existing node B. In the next-generation mobile communication system, all user traffic is served through a shared channel. Therefore, a device for collecting status information, such as buffer status, available transmission power status, and channel status of UEs, and performing scheduling is required. The NR gNB 2c-10 serves as such a device. One NR gNB may control multiple cells. In order to realize super-high data rates compared to the existing LTE system, the next-generation mobile communication system may have a bandwidth equal to or greater than the maximum bandwidth of the existing system. In addition, the next-generation mobile communication system may use, as radio access technology, orthogonal frequency division multiplexing (OFDM), and may further employ a beamforming technique in addition thereto.

In addition, an adaptive modulation and coding (hereinafter, referred to as "AMC") scheme may be applied to determine a modulation scheme and a channel coding rate in accordance with the channel status of a terminal.

The NR CN 2c-05 performs functions such as mobility support, bearer configuration, and QoS configuration. The NR CN is a device that performs various control functions, as well as a mobility management function for a terminal, and may be connected to a plurality of base stations. In addition, the next-generation mobile communication system may interwork with an existing LTE system, and the NR CN may be connected to the MME 2c-25 through a network interface. The MME may be connected to the eNB 2c-30, which is an existing base station in a network 2c-20 with the NR gNB 2c-10.

Figure 2D:
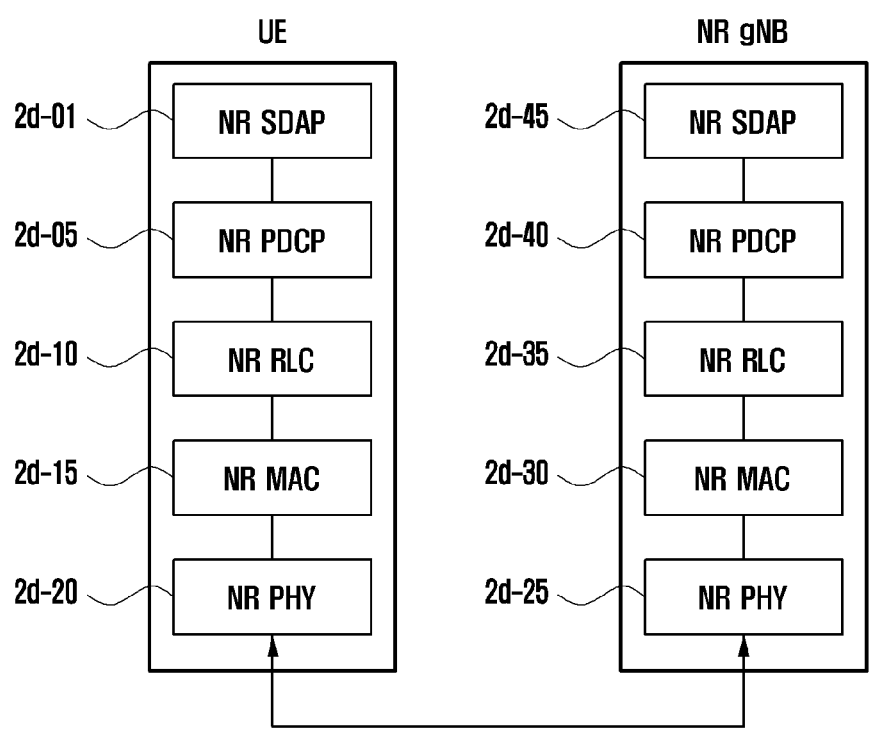
FIG. 2D is a diagram illustrating a radio protocol structure of a next-generation mobile communication system according to an embodiment.

FIG. 2D is a diagram illustrating a radio protocol structure of a next-generation mobile communication system according to an embodiment.

Referring to FIG. 2D, the radio protocol of the next-generation mobile communication system includes NR service data adaptation protocol (SDAP) 2d-01 or 2d-45, NR PDCP 2d-05 or 2d-40, NR RLC 2d-10 or 2d-35, NR MAC 2d-15 or 2d-30, and NR PHY 2d-20 or 2d-25 in a terminal and an NR base station, respectively.

The primary functions of the NR SDAP 2d-01 or 2d-45 may include some of the following functions.

Transfer of user plane data

Mapping between QoS flow and DRB for downlink and uplink

Marking QoS flow ID in both downlink and uplink packets

Mapping reflective QoS flow to DRB for UL SDAP PDUs

With regard to the SDAP layer entity, the terminal may receive a configuration indicating whether or not to use a header of the SDAP layer entity or whether or not to use functions of the SDAP layer entity for each PDCP layer entity, for each bearer, for each logical channel through a radio resource control (RRC) message. In the case where the SDAP header is configured, a 1-bit non-access stratum (NAS) reflective quality-of-service (QoS) configuration indicator and a 1-bit access stratum (AS) reflective QoS configuration indicator of the SDAP header may instruct the terminal to update or reconfigure mapping information between the QoS flow and the data bearers in uplink and downlink. The SDAP header may include QoS flow ID information indicating the QoS. The QoS information may be used as data processing priority, scheduling information, or the like in order to support effective services.

The primary functions of the NR PDCP 2d-05 or 2d-40 may include some of the following functions.

Header compression and decompression (ROHC only)

Transfer of user data

In-sequence delivery of higher-layer PDUs

Out-of-sequence delivery of higher-layer PDUs

Sequence reordering (PDCP PDU reordering for reception)

Duplicate detection of lower-layer SDUs

Retransmission of PDCP SDUs

Ciphering and deciphering

Timer-based SDU discard in uplink

The above reordering function of the NR PDCP entity may denote a function of reordering PDCP PDUs received from a lower layer, based on a PDCP sequence number (SN). The reordering function of the NR PDCP entity may include a function of transmitting data to a higher layer in the reordered order, may include a function of directly transmitting data to a higher layer without consideration of the order thereof, may include a function of reordering the sequence and recording lost PDCP PDUs, may include a function of sending a status report of the lost PDCP PDUs to the transmitting end, and may include a function of making a request for retransmission of the lost PDCP PDUs.

The primary functions of the NR RLC 2d-10 or 2d-35 may include some of the following functions.

Data transfer function (transfer of higher-layer PDUs)
In-sequence delivery of higher-layer PDUs
Out-of-sequence delivery of higher-layer PDUs
ARQ function (error correction through ARQ)
Concatenation, segmentation, and reassembly of RLC SDUs
Re-segmentation of RLC data PDUs
Reordering of RLC data PDUs
Duplicate detection
Protocol error detection
RLC SDU discard
RLC re-establishment The above in-sequence delivery function of the NR RLC entity may denote a function of transferring RLC SDUs received from a lower layer to a higher layer in sequence. The in-sequence delivery function of the NR RLC entity may include a function of, if one original RLC SDU is divided into a plurality of RLC SDUs and received, reassembling and transmitting the same.

The in-sequence delivery function of the NR RLC entity may include a function of reordering the received RLC PDUs, based on an RLC sequence number (SN) or a PDCP sequence number (SN), may include a function of reordering the sequence and recording lost RLC PDUs, may include a function of sending a status report of the lost RLC PDUs to the transmitting end, and may include a function of making a request for retransmission of the lost RLC PDUs.

The in-sequence delivery function of the NR RLC entity 2d-10 or 2d-35 may include a function of, if there is a lost RLC SDU, transmitting only the RLC SDUs preceding the lost RLC SDU to a higher layer in sequence. In addition, the in-sequence delivery function of the NR RLC entity may include a function of, if a predetermined timer expires even though there is a lost RLC SDU, transmitting all RLC SDUs received before the timer starts to a higher layer in sequence. In addition, the in-sequence delivery function of the NR RLC entity may include a function of, if a predetermined timer expires even though there is a lost RLC SDU, transmitting all RLC SDUs received until that point in time to a higher layer in sequence.

In addition, the NR RLC entity 2d-10 or 2d-35 may process the RLC PDUs in the order of reception, regardless of sequence numbers (in an out-of-sequence delivery manner), and may transmit the same to the NR PDCP entity 2d-05 or 2d-40.

In the case of receiving segments, the NR RLC entity 2d-10 or 2d-35 may receive the segments, which are stored in the buffer or will be received later, may reconfigure the same into one complete RLC PDU, and may transmit the same to the NR PDCP.

The NR RLC layer may not include a concatenation function, which may be performed in the NR MAC layer or may be replaced with a multiplexing function of the NR MAC layer.

In the above description, the out-of-sequence delivery of the NR RLC entity may denote a function of directly delivering RLC SDUs received from a lower layer to a higher layer, regardless of the sequence thereof. The out-of-sequence delivery of the NR RLC entity may include a function of, if one original RLC SDU is divided into a plurality of RLC SDUs and is received, reassembling and delivering the same. The out-of-sequence delivery of the NR RLC entity may include a function of storing and ordering RLC SNs or PDCP SNs of the received RLC PDUs, thereby recording the lost RLC PDUs.

The NR MAC 2d-15 or 2d-30 may be connected to a plurality of NR RLC entities configured in a single terminal, and the primary functions of the NR MAC may include some of the following functions.

Mapping between logical channels and transport channels
Multiplexing/demultiplexing of MAC SDUs
Scheduling information reporting
HARQ function (error correction through HARQ)
Priority handling between logical channels of one UE
Priority handling between UEs by means of dynamic scheduling
MBMS service identification
Transport format selection
Padding The NR PHY layers 2d-20 and 2d-25 may perform operations of channel-coding and modulating the higher-layer data into OFDM symbols and transmitting the same through a radio channel, or operations of demodulating and channel-decoding the OFDM symbols received through the radio channel and transmitting the same to a higher layer.

Figure 2E:
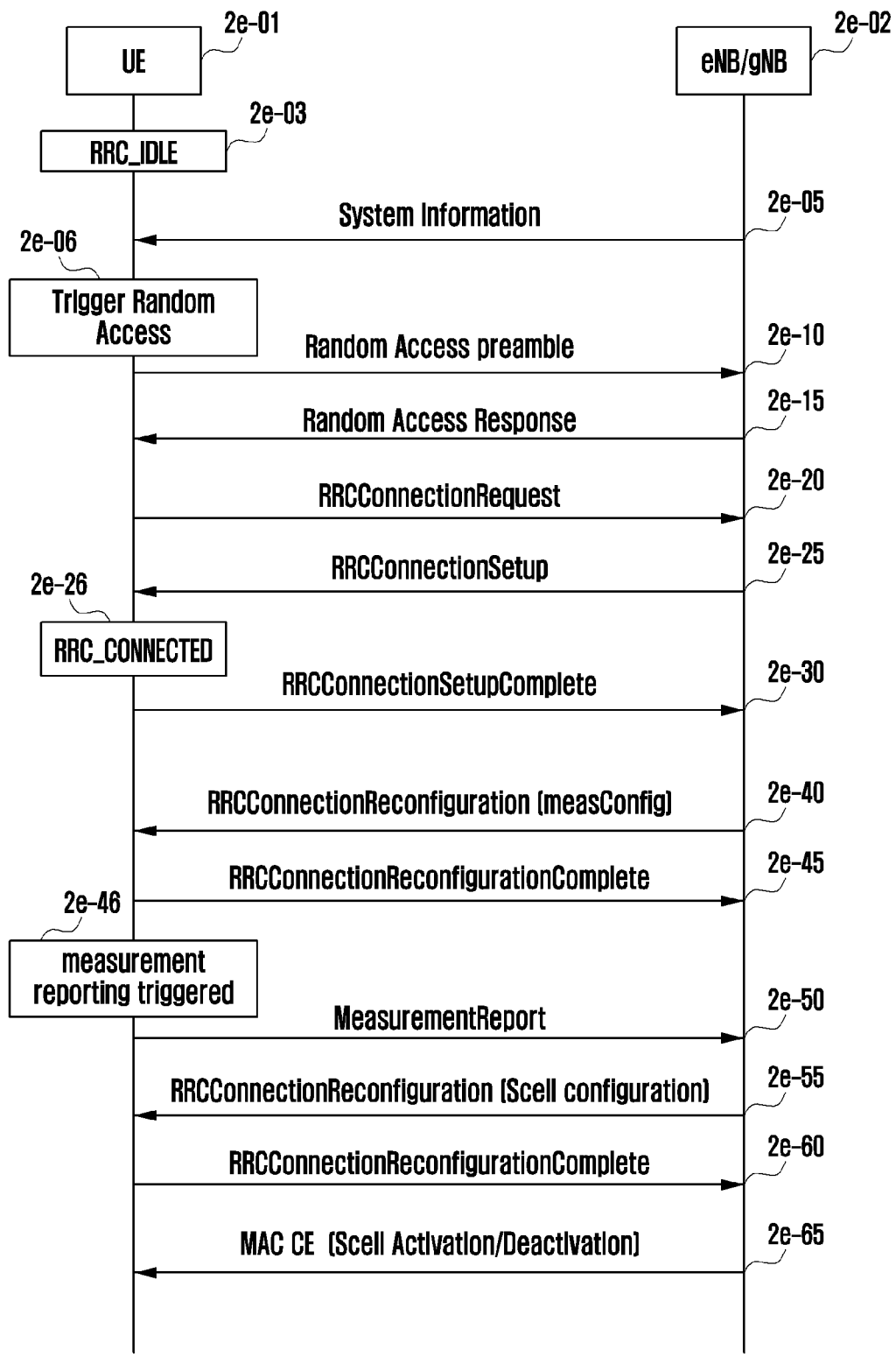
FIG. 2E is a diagram illustrating a procedure in which a terminal that does not support idle-mode measurement establishes an RRC connection with a base station and switches from an RRC idle mode to an RRC connected mode and a procedure in which the base station configures carrier aggregation (hereinafter, referred to as "CA") for the terminal.

FIG. 2E is a diagram illustrating a procedure in which a terminal that does not support idle-mode measurement establishes an RRC connection with a base station and switches from an RRC idle mode to an RRC connected mode and a procedure in which the base station configures carrier aggregation (hereinafter, referred to as "CA") to the terminal, according to an embodiment.

A terminal according to an embodiment may perform frequency measurement to find the cell to camp on or a serving cell in an RRC idle mode, thereby performing a cell selection procedure and/or a cell reselection procedure. However, the terminal separately measures several frequencies in the RRC idle mode, and does not report the measurement results thereof to the base station. That is, after switching from the RRC idle mode to an RRC connected mode, the terminal may measure at least one frequency, based on the measurement configuration (hereinafter, referred to as "measConfig") configured by the base station through an RRC connection reconfiguration message ("RRCConnectionReconfiguration"), and, if a configured condition is satisfied, may transmit a measurement report message ("MeasurementReport") to the base station.

Referring to FIG. 2E, the terminal 2e-01 may be in an RRC idle mode for some reasons (2e-03). The terminal may find an appropriate cell, and may camp thereon in the RRC idle mode through the cell selection procedure and/or the cell reselection procedure, thereby receiving system information (2e-05).

The terminal 2e-01 may trigger random access in order to establish an RRC connection with the base station 2e-02 (2e-06). When the random access is triggered, the terminal may select a PRACH occasion, and may transmit a random access preamble to the base station (2*e*-10). Upon receiving the random access preamble, the base station may transmit, to the terminal, a random access response (hereinafter, referred to as an "RAR") message in response thereto (2*e*-15). The terminal 2*e*-01 in the RRC idle mode may establish reverse-link transmission synchronization with the base station 2*e*-02 through steps 2*e*-10 and 2*e*-15.

The terminal 2*e*-01 in the RRC idle mode, which has established the reverse-link transmission synchronization, may perform an RRC connection establishment procedure with the base station 2*e*-02. First, the terminal 2*e*-01 may transmit an RRC connection setup request message ("RRCConnectionRequest") to the base station (2*e*-20). The message may include at least one of an identifier of the terminal ("ue-Identity"), a cause for establishing an RRC connection ("establishmentCause"), and the like.

If the RRC connection setup request message is received, the base station may transmit an RRC connection setup message ("RRCConnectionSetup") to the terminal (2*e*-25). The message may include radio resource configuration information ("RadioResourceConfigDedicated", "radioBearerConfig", or "masterCellGroup"). If the RRC connection setup message is received, the terminal may identify radio resource configuration information, and may then switch to an RRC connected mode (2*e*-26). The RRC connection establishment may involve a connection of signaling radio bearer1 (SRB1). Therefore, an RRC message, which is a control message between the terminal and the base station, an RRC message including a NAS message, or an initial NAS message may be transmitted and received through SRB1.

The terminal that has switched to the RRC connected mode may transmit an RRC connection setup complete message ("RRCConnectionSetupComplete") to the base station through SRB1 (2*e*-30). The message may include a service request message for the terminal to make a request to the AMF or MME for bearer configuration for a predetermined service.

If the RRC connection establishment procedure is successfully performed, the base station 2*e*-02 may perform an RRC connection reconfiguration procedure with the terminal 2*e*-01. First, the base station may transmit an RRC connection reconfiguration message ("RRCConnectionReconfiguration") to the terminal (2*e*-40). The message may include configuration information on a data radio bearer (DRB) to process user data, configuration information on SRB1 and/or SRB2 through which control messages may be transmitted and received, or measurement configuration ("measConfig"). Upon receiving the RRC connection reconfiguration message, the terminal may apply the above information, and may then transmit an RRC connection reconfiguration complete message ("RRCCoonectionReconfigurationComplete") to the base station (2*e*-45).

If the RRC connection reconfiguration message includes measurement configuration ("measConfig") in step 2*e*-40, the terminal in the RRC connected mode may perform measurement by applying the information, and, if measurement reporting is triggered (2*e*-46), may transmit a measurement report message ("MeasurementReport") to the base station (2*e*-50).

The base station 2*e*-02 having successfully received the measurement report message may perform an RRC connection reconfiguration procedure in order to configure carrier aggregation to the terminal 2*e*-01 in the RRC connected mode. The carrier aggregation according to an embodiment indicates the technique of transmitting/receiving a greater amount of data between the terminal and the base station through additional carriers or SCells (secondary cells or serving cells).

First, the base station may transmit an RRC connection reconfiguration message ("RRCConnectionReconfiguration") to the terminal (2*e*-55). The message may include configuration information about at least one SCell (SCell configuration). For example, the configuration information on the SCell may include at least one piece of information on a list of SCells to add or modify ("sCellToAddModList"), as information elements (hereinafter, "IEs"), and/or information on a list of connected SCells to release ("sCellToReleaseList"). The terminal having successfully received the RRC connection reconfiguration message may apply the configuration information on the SCell, and may then transmit an RRC connection reconfiguration complete message to the base station (2*e*-60). The base station may indicate the state of each SCell (an active state or an inactive state) configured to the terminal through a MAC control element (hereinafter, referred to as "MAC CE") (2*e*-65), thereby applying carrier aggregation.

Figure 2F:
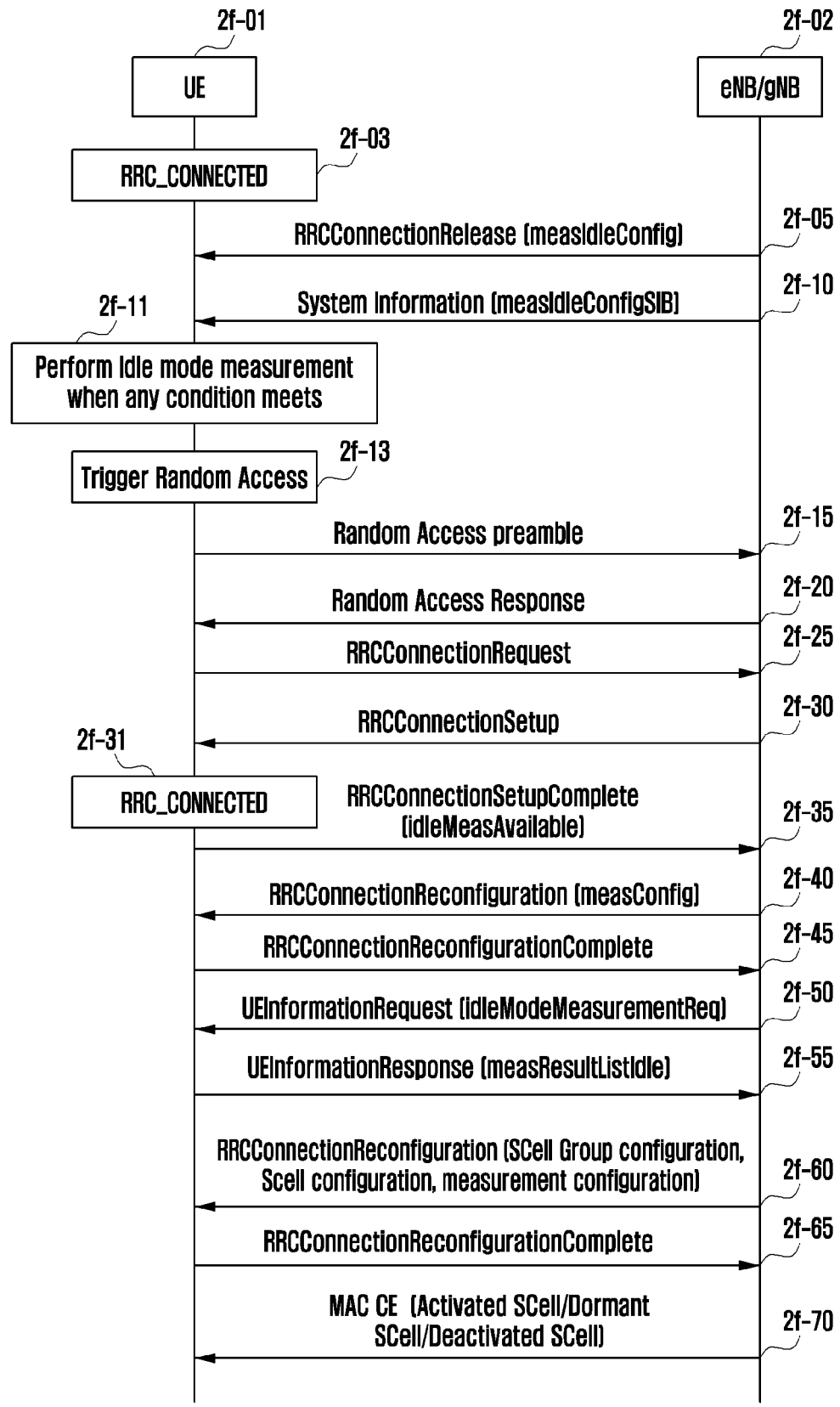
FIG. 2F is a diagram illustrating a procedure in which a terminal supporting idle-mode measurement releases an RRC connection with a base station and performs idle-mode measurement and a procedure in which the base station configures carrier aggregation (hereinafter, referred to as "CA") to the terminal, based on the idle-mode measurement result.

FIG. 2F is a diagram illustrating a procedure in which a terminal supporting idle-mode measurement releases an RRC connection with a base station and performs idle-mode measurement, and in which the base station configures carrier aggregation (CA) to the terminal, based on the idle-mode measurement result, according to an embodiment.

The terminal according to an embodiment may perform frequency measurement to find the cell to camp on or a serving cell in an RRC idle mode, thereby performing a cell selection procedure and/or a cell reselection procedure. In addition, the terminal separately measures several frequencies in the RRC idle mode, and may store the measurement results thereof.

Specifically, the base station may signal, to the terminal, measurement configuration ("measidleConfig") available in the RRC idle mode through an RRC connection release message ("RRCConnectionRelease") or system information (e.g., SIB5 or new SIBx). Therefore, the terminal may measure at least one frequency, based on the measurement configuration available in the RRC idle mode, and, if a configured condition is satisfied, may switch to an RRC connected mode, thereby reporting an measurement report message ("MeasurementReport") to the base station.

Alternatively, in the case where the base station transmits a UE information request message ("UEInformationRequest") to the terminal that has switched from the RRC idle mode to the RRC connected mode in order to request the measurement results, the terminal in the RRC connected mode may transmit, to the base station, a UE information response message ("UEInformationResponse") including the measurement results measured in the RRC idle mode. It is possible to shorten the time for applying carrier aggregation through the measurement in the idle mode above. A detailed operation thereof is as follows.

Referring to FIG. 2F, a terminal 2*f*-01 may establish an RRC connection with a base station 2*f*-02 to thus switch to an RRC connected mode (2*f*-03). If there is no transmission or reception of data by the terminal for a predetermined reason or for a predetermined time, the base station may transmit an RRC connection release message ("RRCConnectionRelease"), thereby causing the terminal to switch to the RRC idle mode (2*f*-05). The RRC connection release message may include measurement configuration ("measidleConfig") available in the RRC idle mode.

"measidleConfig" as an information element (hereinafter, referred to as "IE") may include at least one of the following parameters.

A carrier frequency list that the terminal uses for measurement in the RRC idle mode ("measidleCarrierList")

For example, each carrier frequency used for measurement in the RRC idle mode may include at least one of a carrier frequency ("CarrierFreq") containing an absolute radio frequency channel number value (hereinafter, referred to as an "ARFCN-Value"), an indicator indicating a bandwidth available for measurement ("allowedMeasBandwidth"), a cell list for which the terminal is requested to perform idle-mode measurement ("validityArea"), a cell list for which the terminal is requested to perform idle-mode measurement and report measurement results ("measCellList"), thresholds of reference signal received power (hereinafter, "RSRP") and/or reference signal received quality (hereinafter, RSRQ) for determining whether or not the terminal reports the cells measured through idle-mode measurement, and an indicator indicating whether the terminal reports result values of the cells measured through idle-mode measurement using RSRP or RSRQ or using both RSRP and RSRQ ("reportQuantities").

One or more carrier frequency lists may be used for measurement in the RRC idle mode. For example, the carrier frequency list may be represented to be distinguished as "measidleCarrierListEUTRA" and "measidleCarrierListNR" depending on radio access techniques.

A value indicating the time during which the terminal performs measurement in the RRC idle mode ("measidleDuration")

For example, the value may be a value of the timer T311 or a value of a new timer T3xx.

The terminal may perform idle-mode measurement after receiving an RRC connection release message from the base station before the value expires.

In the case where the RRC connection release message includes "measidleConfig" in step 2f-05, the terminal 2f-01 may delete "VarMeasidleConfig" and "VarMeasidleReport", which are UE variables. In addition, the terminal may store a value (e.g., "measidleDuration") indicating the time during which the measurement in the RRC idle mode is performed in "measidleConfig", and may apply the corresponding value, thereby driving a timer. If the RRC connection release message includes a carrier frequency list that the terminal uses for measurement in the RRC idle mode, the terminal may store the list, and may perform idle-mode measurement while the timer is operating in supportable carriers, based on the stored list (2f-11).

If the RRC connection release message does not include the carrier frequency list, the terminal may find an appropriate cell and camp thereon through a cell selection procedure and/or a cell reselection procedure, thereby receiving system information from the cell (2f-10).

If a carrier frequency list ("measidleConfigSIB") used for the measurement in the RRC idle mode is included in the received system information, and if the timer is still operating, the terminal may store the received "measidleConfigSIB" or replace the old list with "measidleConfigSIB", and may perform idle-mode measurement while the timer is driving in supportable carriers, based on the corresponding list (2f-11).

The idle-mode measurement operation may be configured to be performed only for a frequency satisfying predetermined conditions. For example, the terminal has supportable subcarrier spacing (SCS), and there is SCS that can be supported at a specific frequency. If the SCS supported by the terminal is not supported at a specific frequency, the terminal cannot use the frequency. Therefore, it is also unnecessary to perform an idle-mode measurement operation on the frequency.

According to the disclosure, in the case where a specific frequency does not support the SCS supported by the terminal, the terminal does not perform an idle-mode measurement operation on the frequency. If "measidleConfigSIB" is not included in the system information broadcast by a target cell, based on the cell reselection procedure, the terminal may stop the idle-mode measurement being performed.

The terminal 2f-01 may trigger random access to establish an RRC connection with the base station 2f-02 (2f-13). When the random access is triggered, the terminal may select a PRACH occasion, and may transmit a random access preamble to the base station (2f-15). Upon receiving the random access preamble, the base station may transmit, to the terminal, a random access response (hereinafter, referred to as an "RAR") message in response thereto (2f-20). The terminal 2f-01 in the RRC idle mode may establish reverse-link transmission synchronization with the base station 2f-02 through steps 2f-15 and 2f-20.

The terminal 2f-01 in the RRC idle mode, which has established the reverse-link transmission synchronization, may perform an RRC connection establishment procedure with the base station 2f-02. First, the terminal may transmit an RRC connection setup request message ("RRCConnectionRequest") to the base station (2f-25). The message may include, for example, at least one of information on an identifier of the terminal ("ue-Identity"), information on a cause for establishing an RRC connection ("establishmentCause"), and the like.

If the RRC connection setup request message is received, the base station may transmit an RRC connection setup message ("RRCConnectionSetup") to the terminal (2f-30). The message may include radio resource configuration information ("RadioResourceConfigDedicated", "radioBearerConfig", or "masterCellGroup"). If the RRC connection setup message is received, the terminal may configure radio resource configuration information, and may then switch to an RRC connected mode (2f-31). The RRC connection establishment may involve a connection of signaling radio bearer1 (SRB1). Therefore, an RRC message, which is a control message between the terminal and the base station, an RRC message including a NAS message, or an initial NAS message may be transmitted and received through SRB1.

If the system information received in step 2f-10 includes an indicator ("idleModeMeasurements") indicating that the base station is able to process the idle-mode measurement of the terminal, and if "VarMeasidleReport", which is a variable of the terminal, includes idle-mode measurement information by performing idle-mode measurement in step 2f-11, the terminal that has switched to the RRC connected mode may include an indicator ("idleMeasAvailable") indicating that reporting of idle-mode measurement is possible in the RRC connection setup complete message. If the driven timer (e.g., T311 or T3xx) is running, the terminal may stop the timer. In addition, the terminal may transmit an RRC connection setup complete message ("RRCConnectionSetupComplete") to the base station through SRB1 (2f-35). The message may include a service request message for the terminal to make a request to the AMF or MME for bearer configuration for a predetermined service.

If the RRC connection establishment procedure is successfully performed, the base station 2*f*-02 may perform an RRC connection reconfiguration procedure with the terminal 2*f*-01. First, the base station may transmit an RRC connection reconfiguration message ("RRCConnectionReconfiguration") to the terminal (2*f*-40). The message may include configuration information on a data radio bearer (DRB) to process user data, configuration information on SRB1 and/or SRB2 through which control messages may be transmitted and received, or measurement configuration ("measConfig"). Upon receiving the RRC connection reconfiguration message, the terminal may apply the above information, and may then transmit an RRC connection reconfiguration complete message ("RRCCoonectionReconfigurationComplete") to the base station (2*f*-45).

If the RRC connection setup complete message includes an indicator indicating that reporting of idle-mode measurement is possible ("idleMeasAvailable") in step 2*f*-35, the base station 2*f*-02 may perform UE information procedure with respect to the terminal 2*f*-01. The UE information procedure may be directly performed without performing the RRC connection reconfiguration procedure in steps 2*f*-40 and 2*f*-45 described above. The base station may include an indicator requesting the results measured in the RRC idle mode ("idleModeMeasurementReq") in the UE information request message ("UEInformationRequest"), and may transmit the same to the terminal in the RRC connected mode (2*f*-50). If security is successfully configured, the terminal having received the UE information request message may perform a series of procedures as follows.

1> If the UE information request message includes an indicator ("idleModeMeasurementReq") for requesting the measurement results in the RRC idle mode, and if the terminal stores "VarMeasidleReport",
2> the terminal sets "measResultListidle" included in the UE information response message ("UEInformationResponse") to a "measReportidle" value (or an "idleMeasReport" value) in "VarMeasidleReport".
2> if it is identified that the UE information response message is successfully transmitted from lower layers, the terminal discards "VarMeasidleReport".
1> The terminal submits the UE information request message ("UEInformationResponse") to lower layers through SRB1. Then, the terminal may transmit the UE information response message ("UEInformationResponse") including the result list measured in the RRC idle mode ("measResultListidle") to the base station (2*f*-55).

In the above description, "measResultListidle", which is an IE, indicates a list obtained through the operation in which the terminal configures "measResultidle", which is an IE, for each of one or more neighboring inter-frequency carriers in the RRC idle mode. The terminal according to an embodiment may apply at least one of the following methods for configuring "measResultidle" for each neighboring inter-frequency carrier when transmitting the UE information response message.

Method 1: Each neighboring inter-frequency carrier may optionally include a measurement result of a serving cell ("measResultServingCell") through idle-mode measurement, and may optionally include measurement results of one or more neighboring cells ("measResultNeighCells").
The optional inclusion of the measurement results of the serving cells is due to the fact that it may not be necessary to perform duplicate reports for a plurality of neighboring inter-frequency carriers because there may be only one serving cell of the terminal in the RRC idle mode. For example, "measResultServingCell" may be configured to have a value of 0 or 1 (or "FALSE" or "TURE") for each neighboring inter-frequency carrier, and if "measResultServingCell" has a value of 0 (or "FALSE"), the corresponding value may not be included.
If each neighboring inter-frequency carrier includes a measurement result of the serving cell ("measResultServingCell"), the same measurement result of the serving cell may be included.
The measurement result of the serving cell ("measResultServingCell") may include at least one of the following result values, or may not include the same at all.
RSRP results ("rsrpResult")
RSRQ result ("rsrgResult")
The measurement results of neighboring cells for each neighboring inter-frequency carrier may include at least one of the following parameters.
A carrier frequency ("CarrierFreq") containing an absolute radio frequency channel number value (hereinafter, referred to as an "ARFCN-Value")
A physical cell identifier ("phyCellId") for each neighboring cell
RSRP results ("rsrpResult")
RSRQ results ("rsrqResult")
If there is no measurement result of neighboring cells for all neighboring inter-frequency carriers, "measResultListidle" may not be included in the UE information response message.
Method 2: Each neighboring inter-frequency carrier may include a measurement result of a serving cell ("measResultServingCell") through idle-mode measurement, and may optionally include measurement results of one or more neighboring cells ("measResultNeighCells").
Each neighboring inter-frequency carrier includes a measurement result of the serving cell, and includes the same measurement result. In addition, if each neighboring inter-frequency carrier does not include measurement results of neighboring cells, the corresponding neighboring inter-frequency carrier is not included in "measResultidle". If there is no measurement result of neighboring cells with respect to all neighboring inter-frequency carriers, "measResultListidle" may not be included in the UE information response message.
The measurement result of the serving cell ("measResultServingCell") may include at least one of the following result values.
RSRP results ("rsrpResult")
RSRQ results ("rsrqResult")
The measurement results of neighboring cells for respective neighboring inter-frequency carriers may include at least one of the following parameters.
A carrier frequency ("CarrierFreq") containing an absolute radio frequency channel number value (hereinafter, referred to as an "ARFCN-Value")
A physical cell identifier ("phyCellId") for each neighboring cell
RSRP results ("rsrpResult")
RSRQ results ("rsrqResult")
If the UE information response message includes "measResultListidle" in step 2*f*-55, the base station 2*f*-02 may perform an RRC connection reconfiguration procedure with the terminal 2*f*-01. First, the base station may transmit, to the terminal, an RRC connection reconfiguration message ("RRCConnectionReconfiguration") (2*f*-60). The message may include configuration information on a data radio bearer (DRB) to process user data, configuration information on SRB1 and/or SRB2 through which control messages may be transmitted and received, or measurement configuration ("measConfig"). Upon receiving the RRC connection reconfiguration message, the terminal may apply the above information, and may then transmit an RRC connection reconfiguration complete message ("RRCCoonectionReconfigurationComplete") to the base station (2*f*-65).

The RRC connection reconfiguration message (2*f*-60) may include common configuration parameters for simultaneously setting configuration for multiple SCells (SCell group configuration) or configuration parameters for respective SCells (SCell configuration). In the case where the RRC connection reconfiguration message includes common configuration parameters for multiple SCells, at least one of the following methods may be applied.

Method 1: Common parameters for each SCell group may be included (for example, "SCellGroupToAddModList" or "SCellGroupToReleaseList")

Since there may be a plurality SCell groups, SCell group identifiers for identifying the SCell groups may be included.

Common parameters for respective SCell groups (for example, "sCellConfigCommon" or "sCellGroupCommonConfig") may be included.

A list for adding or modifying one or more cells to or in each SCell group ("sCellToAddModList") may be included. At this time, the initial state of each SCell may be set to an active state, a dormant state, or an inactive state.

A list for releasing one or more cells from each SCell group ("sCellToReleaseList") may be included.

Method 2: Common parameters for respective SCell groups and different parameters for respective SCells in each SCell group may be included (for example, "SCellGroupToAddModList" or "SCellGroupToReleaseList").

Since there may be a plurality of SCell groups, SCell group identifiers for identifying the SCell groups may be included.

Common parameters for respective SCell groups (for example, "sCellConfigCommon" or "sCellGroupCommonConfig") may be included.

A list for adding or modifying one or more cells to or in each SCell group ("sCellToAddModList") may be included. At this time, the initial state of each SCell may be set to an active state, a dormant state, or an inactive state.

An indicator indicating delta configuration may be included in order to apply different parameters to respective SCells in each SCell group. If a specific SCell includes the indicator, the common parameter of the SCell group, to which a specific SCell belongs, may be applied. If a specific SCell does not include the indicator, the common parameter of the SCell group and other parameters may be further included, or only a parameter of the corresponding SCell may be included.

A list for releasing one or more cells from each SCell group ("sCellToReleaseList") may be included.

The base station may indicate the state of each SCell (an active state, a dormant state, or an inactive state) configured to the terminal using a MAC control element (hereinafter, referred to as a "MAC CE") (2*f*-70), thereby applying carrier aggregation.

The idle-mode measurement operation of the disclosure may be applied to an inactive mode in the same manner.

Figure 2G:
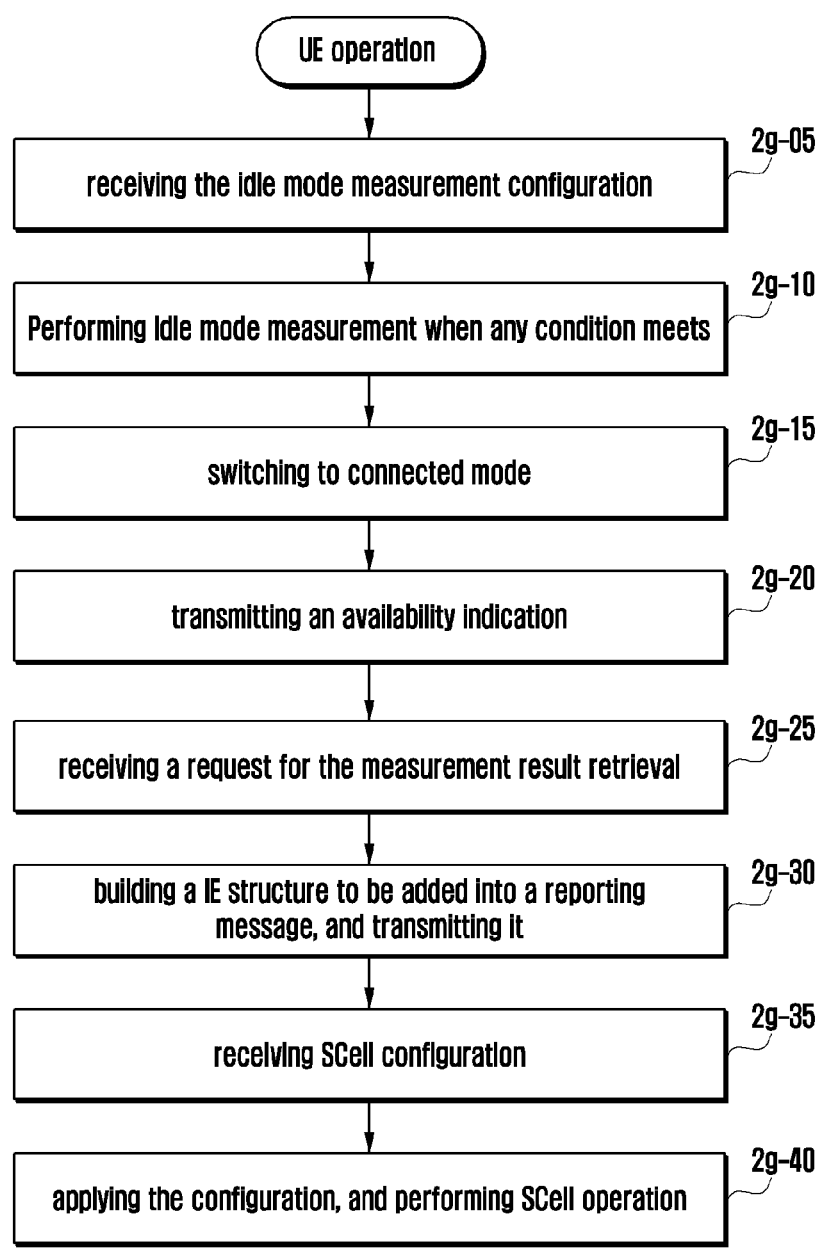
FIG. 2G is a flowchart illustrating the operation of a terminal in the disclosure.

FIG. 2G is a flowchart illustrating the operation of a terminal in the disclosure.

In step 2*g*-05, the terminal may receive idle/inactive mode measurement configuration from the base station. The measurement configuration may be included in an RRC release message for switching the terminal from a connected mode to an idle or inactive mode, or may be provided through system information.

In step 2*g*-10, the terminal may perform the configured idle-mode measurement operation on a frequency that satisfies a predetermined condition. For example, the terminal may perform the idle-mode measurement operation only for a frequency supporting the SCS supported by the terminal.

In step 2*g*-15, the terminal may switch to a connected mode with a single base station.

In step 2*g*-20, the terminal may include one indicator indicating that the terminal stores measurement results collected in the idle or inactive mode in a predetermined RRC message, and may then transmit the same to the base station.

In step 2*g*-25, the terminal receives, from the base station, an RRC message making a request to the terminal for reporting the stored measurement results.

In step 2*g*-30, the terminal may configure the measurement results into predetermined IEs, and may then transmit the same to the base station. IE "measResultidle" may include a single IE "measResultServingCell" containing serving cell measurement results and a single IE "measResultperCarrierList" containing frequency measurement results. "measResultperCarrierList" may be composed of IEs "measResultCarrier" containing frequency-specific measurement results. IE "measResultCarrier" includes a field indicating carrier frequency information of the frequency, and includes a list of IEs containing PCI information on the cells belonging to the corresponding frequency and measurement results corresponding to the respective cells.

In step 2*g*-35, the terminal may receive SCell addition-related configuration information from the base station.

In step 2*g*-40, the terminal may apply the configuration information provided from the base station, and may perform an SCell operation.

Figure 2H:
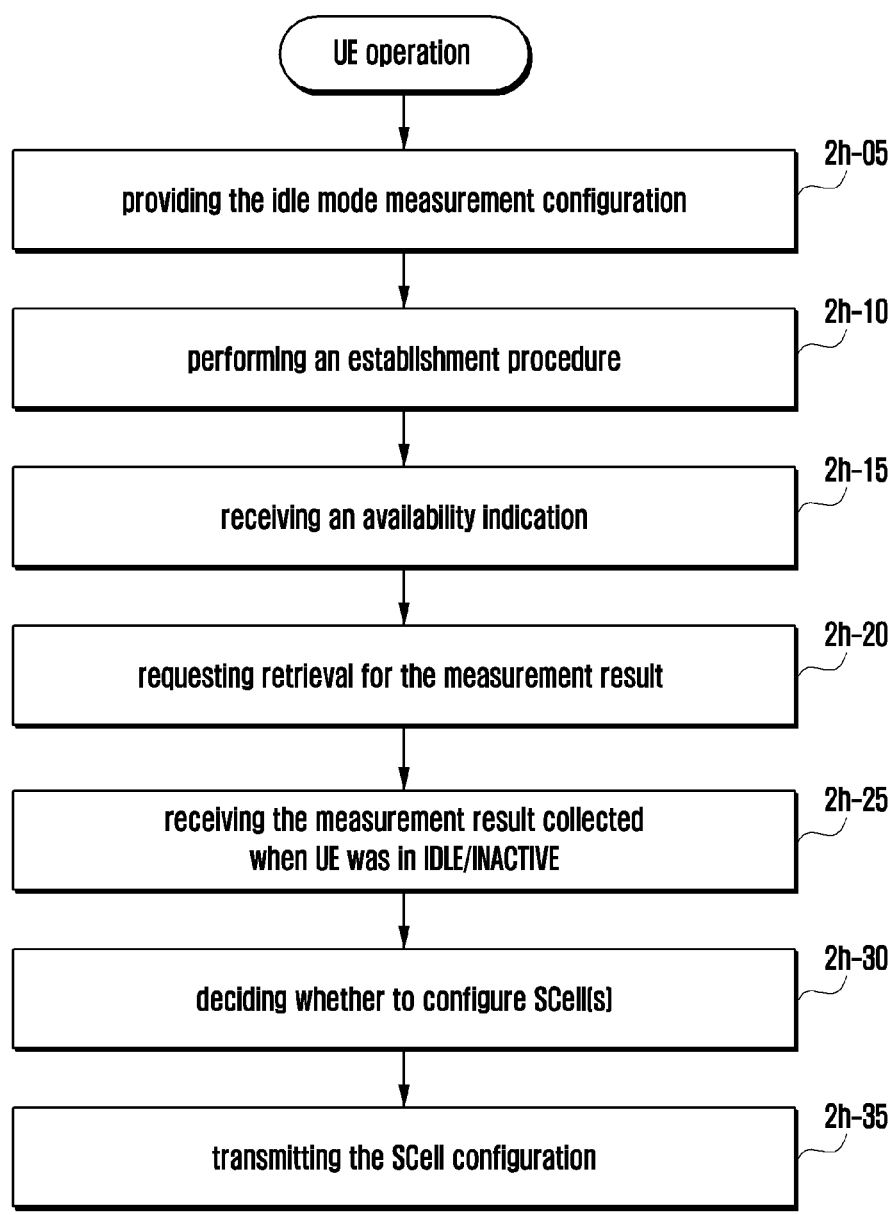
FIG. 2H is a flowchart illustrating the operation of a base station in the disclosure.

FIG. 2H is a flowchart illustrating the operation of a base station in the disclosure.

In step 2*h*-05, the base station may provide idle-mode measurement configuration to the terminal using a dedicated RRC message or system information.

In step 2*h*-10, the base station switches the terminal to a connected mode through an establishment process with the terminal.

In step 2*h*-15, the base station may receive, from the terminal, an indicator indicating that the measurement results collected in an idle or inactive mode are stored in the terminal.

In step 2*h*-20, the base station transmits, to the terminal, an RRC message that makes a request to the terminal for reporting the stored measurement results.

In step 2*h*-25, the base station receives a report of idle-mode measurement results from the terminal.

In step 2*h*-30, the base station may determine whether or not to configure an SCell for the terminal using the result.

In step 2*h*-35, the base station provides configuration information related to addition of an SCell to the terminal.

A method of operating a terminal proposed in the disclosure may include: receiving idle-mode measurement configuration from a base station; in case that the terminal enters an idle mode, performing idle-mode measurement based on the measurement configuration; if the terminal enters a connected mode, generating (or obtaining) a measurement result based on the result of performing the measurement; and reporting the measurement result to the base station, wherein a measurement result for a carrier frequency, which does not support subcarrier spacing (SCS) supported by the terminal, among the carrier frequencies included a carrier frequency list included in the measurement configuration, may not be reported.

In addition, the measurement result may include reference signal received power (RSRP) and reference signal received quality (RSRQ) for a serving cell, and the measurement result may further include a measurement result for each carrier frequency list.

In addition, the measurement result for each carrier frequency list may include a carrier frequency and a measurement result for each cell list for the carrier frequency, and the measurement result for each cell list may include a physical cell ID, RSRP for the cell, and RSRQ therefor.

In addition, the measurement configuration may include the carrier frequency list and timer information indicating a time for performing measurement in the idle mode, and the measurement configuration is received through at least one of a radio resource control (RRC) message or a system information block (SIB).

In addition, the transmitting the measurement result may include: transmitting, to the base station, an RRC connection setup complete message including an indicator indicating that reporting of measurement in the idle mode is possible; receiving, from the base station, a message requesting the measurement result; and transmitting the measurement result to the base station.

Figure 2I:
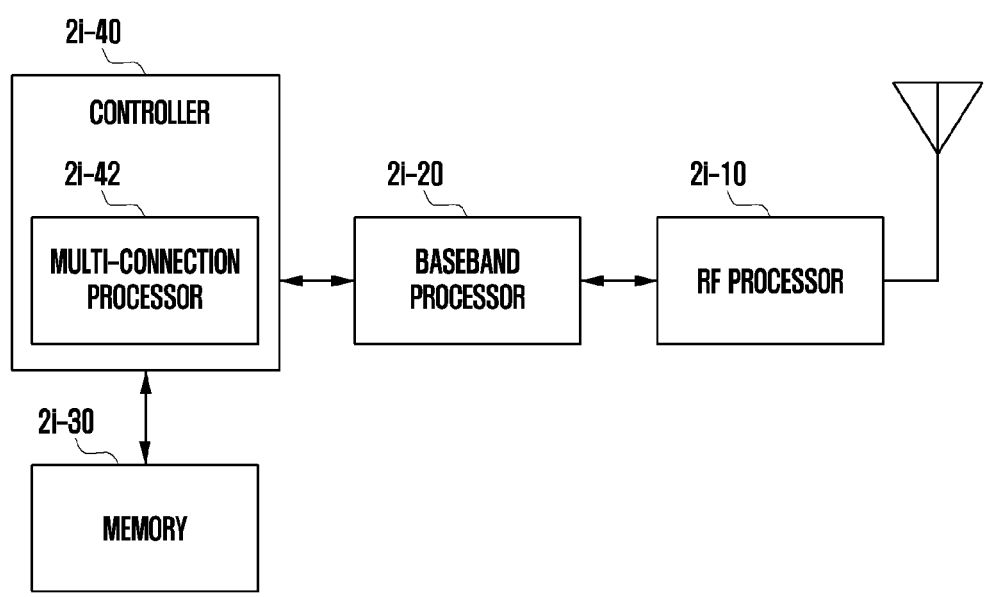
FIG. 2I is a diagram illustrating the structure of a terminal according to an embodiment.

FIG. 2I is a diagram illustrating the structure of a terminal in the disclosure.

Referring to FIG. 2I, the terminal includes a radio frequency (RF) processor 2i-10, a baseband processor 2i-20, a storage unit 2i-30, and a controller 2i-40.

The RF processor 2i-10 performs a function of transmitting and receiving a signal through a radio channel, such as band conversion and amplification of a signal. That is, the RF processor 2i-10 up-converts a baseband signal provided from the baseband processor 2i-20 to an RF band signal to thus transmit the same through an antenna, and down-converts an RF band signal received through the antenna to a baseband signal. For example, the RF processor 2i-10 may include a transmission filter, a reception filter, an amplifier, a mixer, an oscillator, a digital-to-analog converter (DAC), an analog-to-digital converter (ADC), and the like. Although only one antenna is illustrated in FIG. 2I, the terminal may have a plurality of antennas. In addition, the RF processor 2i-10 may include a plurality of RF chains. Further, the RF processor 2i-10 may perform beamforming. To perform beamforming, the RF processor 2i-10 may adjust the phases and magnitudes of signals transmitted and received through a plurality of antennas or antenna elements. In addition, the RF processor may perform MIMO, and may receive multiple layers when performing the MIMO operation.

The baseband processor 2i-20 performs a function of conversion between a baseband signal and a bit string according to the physical layer specification of the system. For example, when transmitting data, the baseband processor 2i-20 encodes and modulates transmission bit strings, thereby generating complex symbols. In addition, when receiving data, the baseband processor 2i-20 demodulates and decodes a baseband signal provided from the RF processor 2i-10 to thus recover reception bit strings. For example, in the case where an orthogonal frequency division multiplexing (OFDM) scheme is applied, when transmitting data, the baseband processor 2i-20 generates complex symbols by encoding and modulating transmission bit strings, maps the complex symbols to subcarriers, and then configures OFDM symbols through an inverse fast Fourier transform (IFFT) operation and cyclic prefix (CP) insertion. In addition, when receiving data, the baseband processor 2i-20 divides the baseband signal provided from the RF processor 2i-10 into OFDM symbol units, restores the signals mapped to the subcarriers through a fast Fourier transform (FFT) operation, and then restores reception bit strings through demodulation and decoding.

The baseband processor 2i-20 and the RF processor 2i-10 transmit and receive signals as described above. Accordingly, the baseband processor 2i-20 and the RF processor 2i-10 may be referred to as a "transmitter", a "receiver", a "transceiver", or a "transceiver". Further, at least one of the baseband processor 2i-20 and the RF processor 2i-10 may include a plurality of communication modules in order to support a plurality of different radio access techniques. In addition, at least one of the baseband processor 2i-20 and the RF processor 2i-10 may include different communication modules to process signals in different frequency bands. For example, the different radio access techniques may include a wireless LAN (e.g., IEEE 802.11), a cellular network (e.g., LTE), and the like. In addition, the different frequency bands may include super-high frequency (SHF) (e.g., 2·NRHz or NRHz) bands or millimeter wave (e.g., 60 GHz) bands.

The storage unit 2i-30 stores data such as fundamental programs, application programs, and configuration information for the operation of the terminal. In particular, the storage unit 2i-30 may store information related to a second access node that performs wireless communication using a second radio access technique. In addition, the storage unit 2i-30 provides the stored data in response to a request of the control unit 2i-40.

The controller 2i-40 controls the overall operation of the terminal. For example, the controller 2i-40 transmits and receives signals through the baseband processor 2i-20 and the RF processor 2i-10. In addition, the controller 2i-40 records and reads data in and from the storage unit 2i-30. To this end, the controller 2i-40 may include at least one multi-connection processor 2i-42. For example, the controller 2i-40 may include a communication processor (CP) for controlling communication and an application processor (AP) for controlling higher layers such as application programs.

Figure 2J:
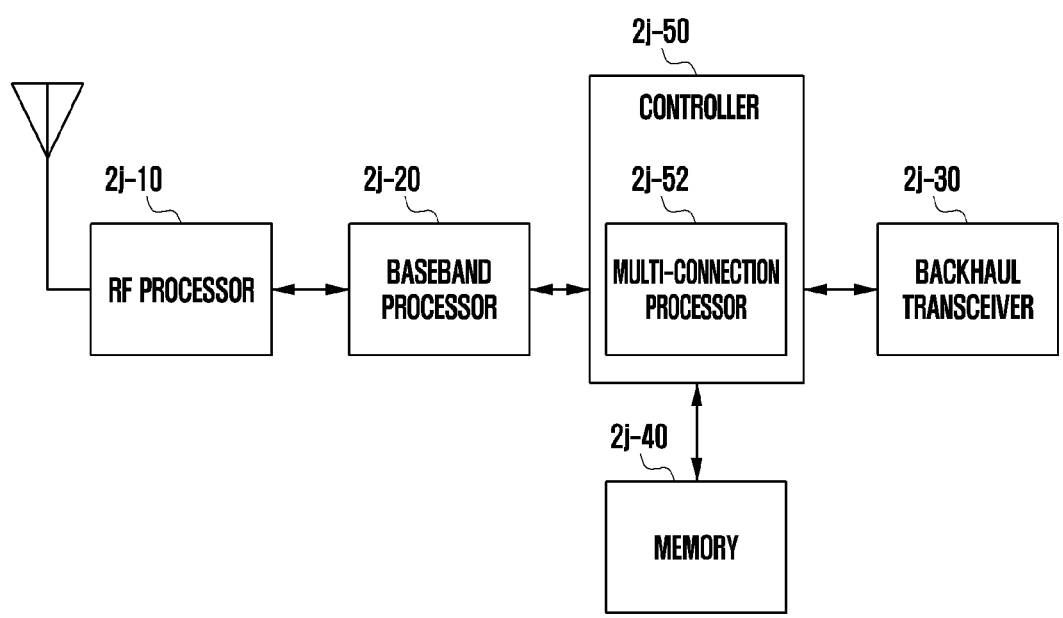
FIG. 2J is a diagram illustrating the structure of a base station according to an embodiment.

FIG. 2J is a block diagram illustrating the configuration of a primary base station in a wireless communication system according to an embodiment.

As shown in FIG. 2J, the base station includes an RF processor 2j-10, a baseband processor 2j-20, a backhaul transceiver 2j-30, a storage unit 2j-40, and a controller 2j-50.

The RF processor 2j-10 performs a function of transmitting and receiving signals, such as band conversion and amplification of a signal, through a radio channel. That is, the RF processor 2j-10 up-converts a baseband signal provided from the baseband processor 2j-20 to an RF band signal to thus transmit the same through an antenna, and down-converts an RF band signal received through the antenna to a baseband signal. For example, the RF processor 2j-10 may include a transmission filter, a reception filter, an amplifier, a mixer, an oscillator, a DAC, an ADC, and the like. Although only one antenna is shown in the drawing, the first access node may have a plurality of antennas. In addition, the RF processor 2j-10 may include a plurality of RF chains. Further, the RF processor 2j-10 may perform beamforming. To perform beamforming, the RF processor 2j-10 may adjust the phases and magnitudes of signals transmitted and received through a plurality of antennas or antenna elements. The RF processor may perform a downlink MIMO operation by transmitting one or more layers.

The baseband processor 2j-20 performs a function of conversion between a baseband signal and a bit string according to a physical layer specification of a first radio access technique. For example, when transmitting data, the baseband processor 2j-20 encodes and modulates transmission bit strings, thereby generating complex symbols. In addition, when receiving data, the baseband processor 2j-20 demodulates and decodes a baseband signal provided from the RF processor 2j-10 to thus recover reception bit strings. For example, in the case where an OFDM scheme is applied, when transmitting data, the baseband processor 2j-20 generates complex symbols by encoding and modulating transmission bit strings, maps the complex symbols to subcarriers, and then configures OFDM symbols through the IFFT operation and CP insertion. In addition, when receiving data, the baseband processor 2j-20 divides the baseband signal provided from the RF processor 2j-10 into OFDM symbol units, restores the signals mapped to the subcarriers through the FFT operation, and then restores reception bit strings through demodulation and decoding. The baseband processor 2j-20 and the RF processor 2j-10 transmit and receive signals as described above. Accordingly, the baseband processor 2j-20 and the RF processor 2j-10 may be referred to as a "transmitter", a "receiver", a "transceiver", a "transceiver", or a "wireless transceiver".

The backhaul transceiver 2j-30 provides an interface for performing communication with other nodes in the network. That is, the backhaul transceiver 2j-30 converts a bit string, transmitted from the primary base station to another node, such as a secondary base station, a core network, etc., into a physical signal, and converts physical signals received from other nodes into bit strings.

The storage unit 2j-40 stores data such as fundamental programs, application programs, and configuration information for the operation of the primary base station. In particular, the storage unit 2j-40 may store information about bearers allocated to a connected terminal, a measurement result reported from a connected terminal, and the like. In addition, the storage unit 2j-40 may store information that is a criterion for determining whether a multi-connection is provided to the terminal or is released. In addition, the storage unit 2j-40 provides the stored data in response to a request from the controller 2j-50.

The controller 2j-50 controls the overall operation of the primary base station. For example, the controller 2j-50 transmits and receives signals through the baseband processor 2j-20 and the RF processor 2j-10 or the backhaul transceiver 2j-30. In addition, the controller 2j-50 records and reads data in and from the storage unit 2j-40. To this end, the controller 2j-50 may include at least one multi-connection processor 2j-52.

Meanwhile, in the drawings illustrating the method of the disclosure, the order of description does not necessarily correspond to the order of execution, and the sequence thereof may be changed or execution may be performed in parallel.

Alternatively, the drawings illustrating the method of the disclosure may include only some of the components, excluding other components, without departing from the scope of the disclosure.

In addition, the disclosure may be executed by means of a combination of all or some of the content included in the respective embodiments without departing from the scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a communication system, the method comprising:
receiving, from a base station, a radio resource control (RRC) release message including configuration information for measurements performed in a RRC idle state or a RRC inactive state, the configuration information including information on a list of at least one carrier frequency, wherein the at least one carrier frequency is associated with at least one subcarrier spacing, respectively;
entering the RRC idle state or the RRC inactive state based on the RRC release message;
in case that the terminal is in the RRC idle state or the RRC inactive state, performing measurement for a carrier frequency supported by the terminal among the at least one carrier frequency, the carrier frequency being associated with a subcarrier spacing supported by the terminal; and
in case that the terminal is in a RRC connected state, transmitting, to the base station, at least one measurement result performed in the RRC idle state or the RRC inactive state, the at least one measurement result including a measurement result for the carrier frequency.

2. The method of claim 1, wherein:
the at least one measurement result further includes a measurement result for a serving cell, and
the measurement result for the serving cell includes at least one of a reference signal received power (RSRP) or a reference signal received quality (RSRQ) for the serving cell.

3. The method of claim 1, wherein:
the measurement result for the carrier frequency includes a list of at least one measurement result for at least one cell associated with the carrier frequency, and
each of the at least one measurement result for the at least one cell includes a physical cell identifier (ID) and at least one of a reference signal received power (RSRP) or a reference signal received quality (RSRQ) for a corresponding cell.

4. The method of claim 1, wherein:
the configuration information further includes information on a time duration for performing the measurements in the RRC idle state or the RRC inactive state, and
the measurement for the carrier frequency is performed in case that a timer with a value set to the time duration is running.

5. The method of claim 1, wherein transmitting the at least one measurement result in case that the terminal is in the RRC connected state comprises:
receiving, from the base station, a first message for requesting to report information associated with the terminal, the first message including an indicator indicating that the terminal is requested to report the at least one measurement result; and as a response to the first message, transmitting, to the base station, a second message including the at least one measurement result.

6. A method performed by a base station in a communication system, the method comprising:
transmitting, to a terminal, a radio resource control (RRC) release message including configuration information for measurements performed in a RRC idle state or a RRC inactive state, the configuration information including information on a list of at least one carrier frequency, wherein the at least one carrier frequency is associated with at least one subcarrier spacing, respectively;
performing a RRC connection procedure with the terminal; and
in case that the terminal is in a RRC connected state based on the RRC connection procedure, receiving, from the terminal, at least one measurement result performed in the RRC idle state or the RRC inactive state,
wherein the at least one measurement result includes a measurement result for a carrier frequency supported by the terminal among the at least one carrier frequency, and
wherein the carrier frequency is associated with a subcarrier spacing supported by the terminal.

7. The method of claim 6, wherein:
the at least one measurement result further includes a measurement result for a serving cell, and
the measurement result for the serving cell includes at least one of a reference signal received power (RSRP) or a reference signal received quality (RSRQ) for the serving cell.

8. The method of claim 6, wherein:
the measurement result for the carrier frequency includes a list of at least one measurement result for at least one cell associated with the carrier frequency, and
each of the at least one measurement result for the at least one cell includes a physical cell identifier (ID) and at least one of a reference signal received power (RSRP) or a reference signal received quality (RSRQ) for a corresponding cell.

9. The method of claim 6, wherein:
the configuration information further includes information on a time duration for performing the measurements in the RRC idle state or the RRC inactive state, and
the measurement for the carrier frequency is performed in case that a timer with a value set to the time duration is running.

10. The method of claim 6, wherein receiving the at least one measurement result in case that the terminal is in the RRC connected state comprises:
transmitting, to the terminal, a first message for requesting to report information associated with the terminal, the first message including an indicator indicating that the terminal is requested to report the at least one measurement result; and
as a response to the first message, receiving, from the terminal, a second message including the at least one measurement result.

11. A terminal in a communication system, the terminal comprising:
a transceiver; and
a controller configured to:
receive, from a base station via the transceiver, a radio resource control (RRC) release message including configuration information for measurements performed in a RRC idle state or a RRC inactive state, the configuration information including information on a list of at least one carrier frequency, wherein the at least one carrier frequency is associated with at least one subcarrier spacing, respectively,
enter the RRC idle state or the RRC inactive state based on the RRC release message,
in case that the terminal is in the RRC idle state or the RRC inactive state, perform measurement for a carrier frequency supported by the terminal among the at least one carrier frequency, the carrier frequency being associated with a subcarrier spacing supported by the terminal, and
in case that the terminal is in a RRC connected state, transmit, to the base station via the transceiver, at least one measurement result performed in the RRC idle state or the RRC inactive state, the at least one measurement result including a measurement result for the carrier frequency.

12. The terminal of claim 11, wherein:
the at least one measurement result further includes a measurement result for a serving cell, and
the measurement result for the serving cell includes at least one of a reference signal received power (RSRP) or a reference signal received quality (RSRQ) for the serving cell.

13. The terminal of claim 11, wherein:
the measurement result for the carrier frequency includes a list of at least one measurement result for at least one cell associated with the carrier frequency, and
each of the at least one measurement result for the at least one cell includes a physical cell identifier (ID) and at least one of a reference signal received power (RSRP) or a reference signal received quality (RSRQ) for a corresponding cell.

14. The terminal of claim 11, wherein:
the configuration information further includes information on a time duration for performing the measurements in the RRC idle state or the RRC inactive state, and
the measurement for the carrier frequency is performed in case that a timer with a value set to the time duration is running.

15. The terminal of claim 11, wherein the controller is configured to:
receive, from the base station via the transceiver, a first message for requesting to report information associated with the terminal, the first message including an indicator indicating that the terminal is requested to report the at least one measurement result, and
as a response to the first message, transmit, to the base station via the transceiver, a second message including the at least one measurement result.

16. A base station in a communication system, the base station comprising:
a transceiver; and
a controller configured to:
transmit, to a terminal via the transceiver, a radio resource control (RRC) release message including configuration information for measurements performed in a RRC idle state or a RRC inactive state, the configuration information including information on a list of at least one carrier frequency, wherein the at least one carrier frequency is associated with at least one subcarrier spacing, respectively,
perform a RRC connection procedure with the terminal, and in case that the terminal is in a RRC connected state based on the RRC connection procedure, receive, from the terminal via the transceiver, at least one measurement result performed in the RRC idle state or the RRC inactive state, wherein the at least one measurement result includes a measurement result for a carrier frequency supported by the terminal among the at least one carrier frequency, and wherein the carrier frequency is associated with a sub-carrier spacing supported by the terminal.

17. The base station of claim 16, wherein:
the at least one measurement result further includes a measurement result for a serving cell, and
the measurement result for the serving cell includes at least one of a reference signal received power (RSRP) or a reference signal received quality (RSRQ) for the serving cell.

18. The base station of claim 16, wherein:
the measurement result for the carrier frequency includes a list of at least one measurement result for at least one cell associated with the carrier frequency, and
each of the at least one measurement result for the at least one cell includes a physical cell identifier (ID) and at least one of a reference signal received power (RSRP) or a reference signal received quality (RSRQ) for a corresponding cell.

19. The base station of claim 16, wherein:
the configuration information further includes information on a time duration for performing the measurements in the RRC idle state or the RRC inactive state, and
the measurement for the carrier frequency is performed in case that a timer with a value set to the time duration is running.

20. The base station of claim 16, wherein the controller is configured to:
transmit, to the terminal via the transceiver, a first message for requesting to report information associated with the terminal, the first message including an indicator indicating that the terminal is requested to report the at least one measurement result, and
as a response to the first message, receive, from the terminal via the transceiver, a second message including the at least one measurement result.

\* \* \* \* \*